(12) United States Patent
Chung et al.

(10) Patent No.: US 9,823,449 B1
(45) Date of Patent: Nov. 21, 2017

(54) OPTICAL TELEPHOTO IMAGING LENS

(71) Applicant: GLORY SCIENCE CO., LTD., Changhua Hsien (TW)

(72) Inventors: Feng-Chao Chung, Changhua Hsien (TW); Kun-Ti Liu, Changhua Hsien (TW)

(73) Assignee: Glory Science Co., Ltd., Changhua Hsien (TW)

( * ) Notice: Subject to any disclaimer, the term of this patent is extended or adjusted under 35 U.S.C. 154(b) by 0 days.

(21) Appl. No.: 15/333,858

(22) Filed: Oct. 25, 2016

(51) Int. Cl.
| | |
|---|---|
| *G02B 9/60* | (2006.01) |
| *G02B 13/02* | (2006.01) |
| *G02B 3/00* | (2006.01) |
| *G02B 5/20* | (2006.01) |

(52) U.S. Cl.
CPC .......... *G02B 13/02* (2013.01); *G02B 3/0043* (2013.01); *G02B 3/0062* (2013.01); *G02B 5/208* (2013.01)

(58) Field of Classification Search
CPC .... G02B 13/02; G02B 3/0043; G02B 3/0062; G02B 5/208
See application file for complete search history.

(56) References Cited

U.S. PATENT DOCUMENTS

| | | |
|---|---|---|
| 7,436,600 B1 | 10/2008 | Noda |
| 8,000,031 B1 | 8/2011 | Tsai |
| 8,395,851 B2 | 3/2013 | Tang et al. |
| 8,508,860 B2 | 8/2013 | Tang et al. |
| 8,537,472 B2 * | 9/2013 | Tsai ................ G02B 13/0045 359/714 |
| 2013/0021677 A1 | 1/2013 | Kubota |
| 2015/0131162 A1 | 5/2015 | Noda |

* cited by examiner

*Primary Examiner* — Joseph P Martinez
(74) *Attorney, Agent, or Firm* — Gemini Patent Services, Inc.

(57) ABSTRACT

An optical telephoto imaging lens includes an aperture stop and a lens group, the lens group includes, in order from an object side to the image side: a first lens element with a positive refractive power; a second lens element with a negative refractive power; a third lens element with a refractive power; a fourth lens element with a negative refractive power; a fifth lens element with a positive refractive power. The first, second, third, fourth and fifth lens elements each have a focal length: f1, f2, f3, f4 and f5, the object-side and the image-side surfaces of the second lens element each have a radius of curvature R3, R4, and they satisfy the relations: |fn|>|f4|>|f2|>|f1|, wherein n=3 and 5; 0<(R3+R4)/(R3−R4)<0.5.

15 Claims, 16 Drawing Sheets

OPTICAL TELEPHOTO IMAGING LENS

BACKGROUND

Field of the Invention

The present invention relates to an imaging lens, and more particularly to an optical telephoto imaging lens.

Related Prior Art

In recent years, with the popularity of the mobile phone cameras, the optical lens system has become smaller in size, and the electronic sensor of a general digital camera is typically a CCD (Charge Coupled Device) or CMOS (Complementary Metal Oxide Semiconductor) sensor. Due to advances in semiconductor manufacturing, the pixel size of sensor has been reduced continuously, and miniaturized optical lens systems have increasingly higher resolution. Therefore, there are increasing demands for an imaging lens system with better image quality, and for a telephoto imaging lens.

Conventional miniaturized lens systems used in portable electronic products mostly consist of four lens elements, however, since the high profile mobile devices, such as smart phone, wearable device, tablet personal computer, and infrared imaging lens, are becoming prevalent, the demand for resolution and imaging quality of the miniaturized lens system also increases. The conventional four-piece lens system cannot satisfy higher demand, and is unsuitable for telephoto imaging.

The conventional miniaturized imaging lens used in mobile devices, such as, mobile phone, tablet computer and other wearable electronic devices, such as the imaging lenses described in U.S. Pat. No. 7,436,600, 2013/0021677 and 2015/0131162, maybe suitable for telephoto imaging, however, the configuration is too complicated and large to be installed in a mobile device.

The imaging lenses consisting of five lens elements disclosed in U.S. Pat. Nos. 8,000,031, 8,508,860, and 8,395,851 have a simplified structure and are also small enough to be installed in the mobile device, but are still incapable of long distance imaging.

The present invention has been made in order to solve the above-mentioned problems.

SUMMARY

The primary objective of the present invention is to provide an optical telephoto imaging lens having a suitable angle of view and short track length as well as high resolution.

An optical telephoto imaging lens in accordance with the present invention comprises an aperture stop and a lens group, the lens group comprises, in order from an object side to the image side:

a first lens element with a positive refractive power having an object-side surface being convex near an optical axis and an image-side surface being convex near the optical axis, the object-side surface and the image-side surface of the first lens element being aspheric, and the first lens element being made of plastic material;

a second lens element with a negative refractive power has an object-side surface being concave near the optical axis and an image-side surface being concave near the optical axis, the object-side surface and the image-side surface of the second lens element being aspheric, and the second lens element being made of plastic material;

a third lens element with a refractive power having an image-side surface being concave near the optical axis, an object-side surface and the image-side surface of the third lens element being aspheric, the third lens element being made of plastic material;

a fourth lens element with a negative refractive power having an object-side surface being concave near the optical axis, the object-side surface and an image-side surface of the fourth lens element being aspheric, the fourth lens element being made of plastic material;

a fifth lens element with a positive refractive power, an object-side surface and an image-side surface of the fifth lens element being aspheric, the fifth lens element being made of plastic material, and the object-side surface of the fifth lens element-is concave at the periphery;

wherein a focal length of the first lens element is f1, a focal lens length of the second lens element is f2, a focal length of the third lens element is f3, a focal length of the fourth lens element is f4, a focal length of the fifth lens element is f5, a radius of curvature of the object-side surface of the second lens element is R3, a radius of curvature of the image-side surface of the second lens element is R4, and they satisfy the relations:

$$|fn|>|f4|>|f2|>|f1|, \text{ wherein } n=3 \text{ and } 5;$$

$$0<(R3+R4)/(R3-R4)<0.5.$$

If |fn|>|f4|>|f2|>|f1| satisfies the above condition, the refractive powers of the respective lens element are more suitable, so that the purpose of telephoto imaging is achieved, and the lens also becomes more compact for easy installation into a mobile device.

If (R3+R4)/(R3−R4) satisfies the above condition, it can reduce the spherical aberration and astigmatism of the optical telephoto imaging lens.

Preferably, an Abbe number of the second lens element is V2, an Abbe number of the third lens element is V3, an Abbe number of the fifth lens element is V5, and they satisfy the following relations: 25<V3−V2<40; 25<V3−V5<40, which can reduce the chromatic aberration of the optical telephoto imaging lens effectively.

Preferably, a distance along an optical axis between the aperture stop and the image-side surface of the fifth lens element is SD, a distance along the optical axis between the object-side surface and the first lens element to the image-side surface of the fifth lens element is TD, and they satisfy the relation: 0.55<SD/TD<0.9. The appropriate position of the aperture stop make the chief rays entering into the electronic photosensitive device more suitable for the electronic photosensitive device, which can reduce color shift, provide better relative illumination around the periphery of the image-side surface, and avoid dark corner phenomenon.

Preferably, a focal length of the optical telephoto imaging lens is f, the focal length of the first lens element is f1, and they satisfy the relation: 0.25<f1/f<0.5, so that the refractive power of the first lens element can be maintained in the appropriate range, and the maximal field of view (FOV) of the optical telephoto imaging lens can be maintained in the appropriate angle, which can reduce the sensitivity to assembly of the first lens element.

Preferably, the focal length of the third lens element is f3, the focal length of the fifth lens element is f5, and they satisfy the relation: |1/f3|+|1/f5|<0.35, so that the appropriate focal length distribution can reduce the length of the optical telephoto imaging lens, further improve the imaging performance of the optical telephoto imaging lens.—

Preferably, a focal length of the optical telephoto imaging lens is f, a radius of curvature of the object-side surface of the fifth lens element is R9, and they satisfy the relation:

|f/R9|<1, which can correct the field curvature effectively and will be favorable to control the ghost phenomenon of the object-side surface and the image-side surface of the fifth lens element caused by internal reflection while providing aspheric surfaces.

Preferably, the focal length of the optical telephoto imaging lens is f, a distance along the optical axis from the object-side surface of the first lens element to the image plane is TTL, and they satisfy the relation: 0.75<TTL/f<1, so that the function of telephoto imaging is achieved, and the optical telephoto imaging lens is effectively miniaturized.

Preferably, the optical telephoto image lens has a maximum view angle FOV, and it satisfies the relation: 30 degree<FOV<50 degree, so that the optical telephoto imaging lens has a suitable angle of view.

An optical telephoto imaging lens in accordance with the present invention comprises an aperture stop and a lens group, the lens group comprises, in order from an object side to the image side:

a first lens element with a positive refractive power having an object-side surface being convex near an optical axis and an image-side surface being convex near the optical axis, the object-side surface and the image-side surface of the first lens element being aspheric, and the first lens element being made of plastic material;

a second lens element with a negative refractive power has an object-side surface being concave near the optical axis and an image-side surface being concave near the optical axis, the object-side surface and the image-side surface of the second lens element being aspheric, and the second lens element being made of plastic material;

a third lens element with a refractive power having an image-side surface being concave near the optical axis, an object-side surface and the image-side surface of the third lens element being aspheric, the third lens element being made of plastic material;

a fourth lens element with a negative refractive power having an object-side surface being concave near the optical axis, the object-side surface and an image-side surface of the fourth lens element being aspheric, the fourth lens element being made of plastic material;

a fifth lens element with a refractive power, an object-side surface and an image-side surface of the fifth lens element being aspheric, the fifth lens element being made of plastic material, and the object-side surface of the fifth lens element is concave at the periphery;

wherein a focal length of the optical telephoto imaging lens is f, a focal length of the third lens element is f3, a focal length of the fifth lens element is f5, a radius of curvature of the object-side surface of the fifth lens element is R9, an Abbe number of the second lens element is V2, an Abbe number of the third lens element is V3, an Abbe number of the fifth lens element is V5, and they satisfy the relations:

$|1/f3|+|1/f5|<0.35;$ $|f/R9|<1;$ $25<V3-V2<40;$ $25<V3-V5<40.$

If |1/f3|+|1/f5| satisfies the above condition, the appropriate focal length distribution can reduce the length of the optical telephoto imaging lens, further improve the imaging performance of the optical telephoto imaging lens.

When |f/R9|<1, which can correct the field curvature effectively and will be favorable to control the ghost phenomenon of the object-side surface and the image-side surface of the fifth lens element caused by internal reflection while providing aspheric surfaces.

If 25<V3-V2<40; 25<V3-V5<40, the chromatic aberration of the optical telephoto imaging lens can be reduced effectively for better image resolution.

Preferably, a distance along an optical axis between the aperture stop and the image-side surface of the fifth lens element is SD, a distance along the optical axis between the object-side surface of the first lens element and the image-side surface of the fifth lens element is TD, and the following condition is satisfied: 0.55<SD/TD<0.9, it can make the chief ray angle with respect to the image plane of the optical imaging lens cooperated with the electronic sensor, so as to avoid causing color shift as well as the dark corner phenomenon.

Preferably, a focal length of the optical telephoto imaging lens is f, the focal length of the first lens element is f1, and they satisfy the relation: 0.25<f1/f<0.5, so that the refractive power of the first lens element can be maintained in the appropriate range, and the maximal field of view (FOV) of the optical telephoto imaging lens can be maintained in the appropriate angle, which can reduce the sensitivity to assembly of the first lens element.

Preferably, a radius of curvature of the object-side surface of the first lens element is R1, a radius of curvature of the image-side surface of the first lens element is R2, and they satisfy the relation: −0.6<(R1+R2)/(R1−R2)<−0.35, it can reduce the aberrations of the optical telephoto imaging lens, and provide better decenter sensitivity.

Preferably, the focal length of the optical telephoto imaging lens is f, a focal length of the fourth lens element is f4, and they satisfy the relation: −2.0<f4/f<−0.5, so that the refractive power of the fourth lens element can be maintained in the appropriate range, and the refractive power of the fifth lens element can be dispersed reasonably, which can reduce the sensitivity to assembly of the fourth and fifth lens elements.

Preferably, the focal length of the optical telephoto imaging lens is f, a distance along the optical axis from the object-side surface of the first lens element to the image plane is TTL, and they satisfy the relation: 0.75<TTL/f<1, so that the function of telephoto imaging is achieved, and the optical telephoto imaging lens is effectively miniaturized.

Preferably, the optical telephoto image lens has a maximum view angle FOV, and it satisfies the relation: 30 degree<FOV<50 degree, so that the optical telephoto imaging lens has a suitable angle of view.

The present invention will be presented in further details from the following descriptions with the accompanying drawings, which show, for purpose of illustrations only, the preferred embodiments in accordance with the present invention.

DETAILED DESCRIPTION

The present invention will be clearer from the following description when viewed together with the accompanying drawings, which show, for purpose of illustrations only, the preferred embodiment in accordance with the present invention.

Figure 1A:
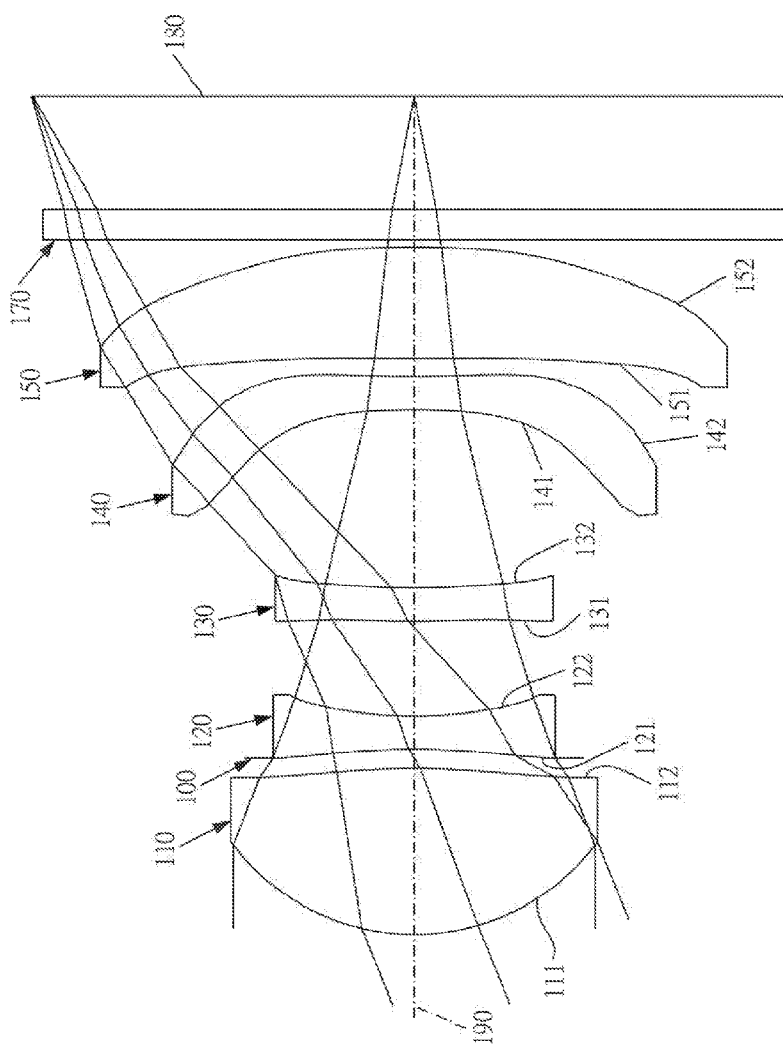
FIG. 1A shows an optical telephoto imaging lens in accordance with a first embodiment of the present invention.
Figure 1B:
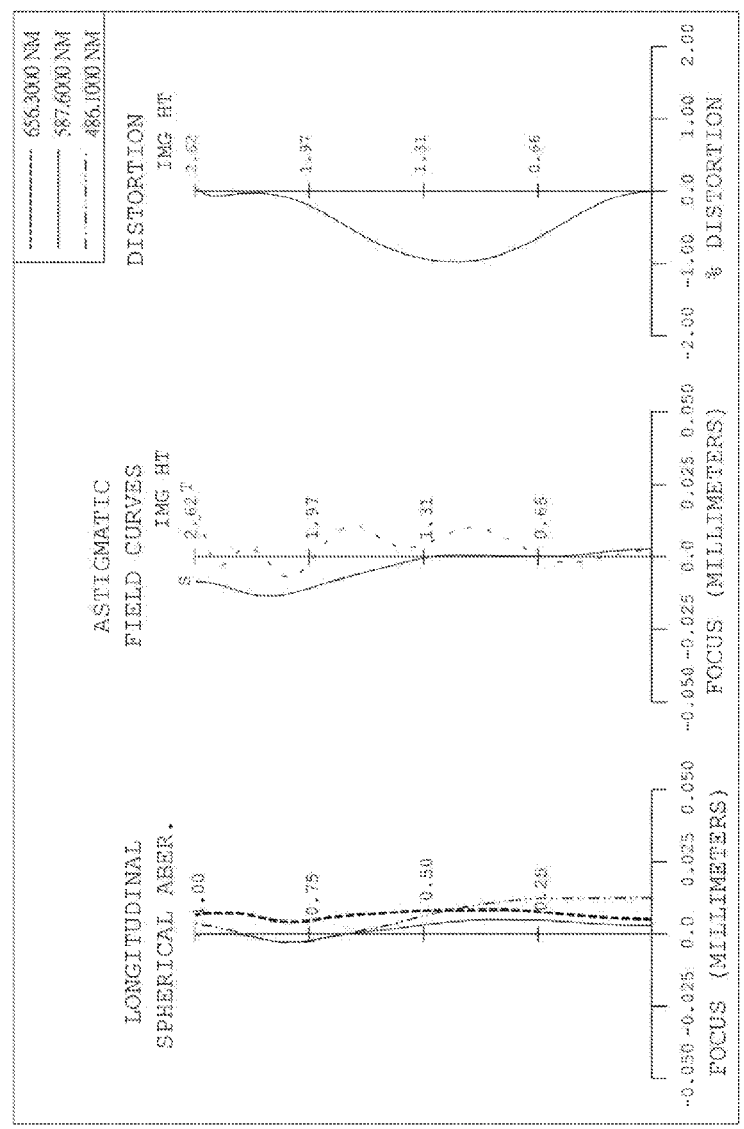
FIG. 1B shows the longitudinal spherical aberration curve, the astigmatic field curve and the distortion curve of the first embodiment of the present invention.

Referring to FIGS. 1A and 1B, FIG. 1A shows an optical telephoto imaging lens in accordance with a first embodiment of the present invention, and FIG. 1B shows, in order from left to right, the longitudinal spherical aberration curves, the astigmatic field curves, and the distortion curve of the first embodiment of the present invention. An optical telephoto imaging lens in accordance with the first embodiment of the present invention comprises an aperture stop 100 and a lens group. The lens group comprises, in order from an object side to the image side: a first lens element 110, a second lens element 120, a third lens element 130, a fourth lens element 140, a fifth lens element 150, an IR cut filter 170 which is made of glass, and an image plane 180, wherein the optical telephoto imaging lens has a total of five lens elements with refractive power. The aperture stop 100 is disposed between the first lens element 110 and the second lens element 120.

The first lens element 110 with a positive refractive power has an object-side surface 111 being convex near an optical axis 190 and an image-side surface 112 being convex near the optical axis 190, the object-side surface 111 and the image-side surface 112 are aspheric, and the first lens element 110 is made of plastic material.

The second lens element 120 with a negative refractive power has an object-side surface 121 being concave near the optical axis 190 and an image-side surface 122 being concave near the optical axis 190, the object-side surface 121 and the image-side surface 122 are aspheric, and the second lens element 120 is made of plastic material.

The third lens element 130 with a negative refractive power has an object-side surface 131 being convex near the optical axis 190 and an image-side surface 132 being concave near the optical axis 190, the object-side surface 131 and the image-side surface 132 are aspheric, the third lens element 130 is made of plastic material.

The fourth lens element 140 with a negative refractive power has an object-side surface 141 being concave near the optical axis 190 and an image-side surface 142 being concave near the optical axis 190, and the object-side surface 141 and the image-side surface 142 are aspheric, the fourth lens element 140 is made of plastic material.

The fifth lens element 150 with a positive refractive power has an object-side surface 151 being convex near the optical axis 190 and an image-side surface 152 being convex near the optical axis 190, the object-side surface 151 and the image-side surface 152 are aspheric, and the fifth lens element 150 is made of plastic material. In this embodiment, the object-side surface 151 of the fifth lens element 150 is concave at the periphery, namely, the object-side surface 151 of the fifth lens element 150 along the optical axis 190 to the periphery of the object-side surface 151 changes from convex to concave.

The IR cut filter 170 made of glass is located between the fifth lens element 150 and the image plane 180 and has no influence on the focal length of the telephoto imaging lens.

The equation for the aspheric surface profiles of the respective lens elements of the first embodiment is expressed as follows:

$$z(h) = \frac{ch^2}{1 + \sqrt{1 - (1+k)c^2h^2}} + A_4h^4 + A_6h^6 + A_8h^8 + A_{10}h^{10} + A_{12}h^{12} + A_{14}h^{14} + \ldots$$

wherein:

z represents the value of a reference position with respect to a vertex of the surface of a lens and a position with a height h along the optical axis 190;

c represents a paraxial curvature equal to 1/R (R: a paraxial radius of curvature);

h represents a vertical distance from the point on the curve of the aspheric surface to the optical axis 190;

k represents the conic constant;

$A_4, A_6, A_8, A_{10}, A_{12}, A_{14}, \ldots$ : represent the high-order aspheric coefficients.

In the first embodiment of the present optical telephoto imaging lens, a focal length of the optical telephoto image lens is f, a f-number of the optical telephoto image lens is Fno, half of the maximal field of view of the optical telephoto image lens is HFOV, and they satisfy the relations:

$f$=6.56 mm;

$Fno$=2.65; and $HFOV$=21.76 degree.

In the first embodiment of the present optical telephoto imaging lens, a focal length of the first lens element 110 is f1, a focal lens length of the second lens element 120 is f2, a focal length of the third lens element 130 is f3, a focal length of the fourth lens element 140 is f4, a focal length of the fifth lens element 150 is f5, and they satisfy the relations:

$|fn|>|f4|>|f2|>|f1|$, wherein $n=3$ and 5, and $|f1|=2.38$, $|f2|=2.88$, $|f3|=39.36$, $|f4|=5.68$, $|f5|=12.91$ In the first embodiment of the present optical telephoto imaging lens, a radius of curvature of the object-side surface 121 of the second lens element 120 is R3, a radius of curvature of the image-side surface 122 of the second lens element 120 is R4, and they satisfy the following relation:

$(R3+R4)/(R3-R4)=0.27$.

In the first embodiment of the present optical telephoto imaging lens, an Abbe number of the second lens element 120 is V2, an Abbe number of the third lens element 130 is V3, an Abbe number of the fifth lens element 150 is V5, and they satisfy the following relations:

$V3-V2=32.0; V3-V5=34.0$

In the first embodiment of the present optical telephoto imaging lens, a distance along the optical axis 190 between the aperture stop 100 and the image-side surface 152 of the fifth lens element 150 is SD, a distance along the optical axis 190 between the object-side surface 111 of the first lens element 110 and the image-side surface 152 of the fifth lens element 150 is TD, and they satisfy the relation:

$SD/TD=0.74$.

In the first embodiment of the present optical telephoto imaging lens, a focal length of the optical telephoto imaging lens is f, the focal length of the first lens element 110 is f1, and they satisfy the relation:

$f1/f=0.36$.

In the first embodiment of the present optical telephoto imaging lens, the focal length of the third lens element 130 is f3, the focal length of the fifth lens element 150 is f5, and they satisfy the relation:

$|1/f3|+|1/f5|=0.10$.

In the first embodiment of the present optical telephoto imaging lens, the focal length of the optical telephoto imaging lens is f, a radius of curvature of the object-side surface 151 of the fifth lens element 150 is R9, and they satisfy the relation:

$|f/R9|=0.21$.

In the first embodiment of the present optical telephoto imaging lens, the focal length of the optical telephoto imaging lens is f, a distance along the optical axis 190 from the object-side surface 111 of the first lens element 110 to the image plane 180 is TTL, and they satisfy the relation: $TTL/f=0.88$.

In the first embodiment of the present optical telephoto imaging lens, a radius of curvature of the object-side surface 111 of the first lens element 110 is R1, a radius of curvature of the image-side surface 112 of the first lens element 110 is R2, and they satisfy the relation: $(R1+R2)/(R1-R2)=-0.49$.

In the first embodiment of the present optical telephoto imaging lens, the focal length of the optical telephoto imaging lens is f, the focal length of the fourth lens element 140 is f4, and they satisfy the relation: $f4/f=-0.87$.

The detailed optical data of the first embodiment is shown in table 1, and the aspheric surface data is shown in table 2.

TABLE 1

Embodiment 1
f(focal length) = 6.56 mm, Fno = 2.65, HFOV = 21.76 deg.

| Surface | | Curvature Radius | | Thickness | Material | index | Abbe # | Focal length |
|---|---|---|---|---|---|---|---|---|
| 0 | object | Plane | | Infinity | | | | |
| 1 | Lens 1 | 1.54 | (ASP) | 1.15 | plastic | 1.515 | 57.0 | 2.38 |
| 2 | | −4.45 | (ASP) | 0.07 | | | | |
| 3 | aperture stop | plane | | 0.06 | | | | |
| 4 | Lens 2 | −4.90 | (ASP) | 0.23 | plastic | 1.615 | 25.0 | −2.88 |
| 5 | | 2.83 | (ASP) | 0.66 | | | | |
| 6 | Lens 3 | 6.87 | (ASP) | 0.23 | plastic | 1.515 | 57.0 | −39.36 |
| 7 | | 5.07 | (ASP) | 1.23 | | | | |
| 8 | Lens 4 | −5.14 | (ASP) | 0.23 | plastic | 1.545 | 56.0 | −5.68 |
| 9 | | 7.90 | (ASP) | 0.12 | | | | |
| 10 | Lens 5 | 30.62 | (ASP) | 0.77 | plastic | 1.633 | 23.0 | 12.91 |
| 11 | | −11.03 | (ASP) | 0.05 | | | | |
| 12 | IR-filter | plane | | 0.21 | glass | 1.517 | 64.2 | — |
| 13 | | plane | | 0.78 | | | | |
| 14 | image | plane | | 0.00 | | | | |

*reference wavelength 587.6 nm

TABLE 2

| | Aspheric Coefficients | | | | |
|---|---|---|---|---|---|
| Surface # | 1 | 2 | 4 | 5 | 6 |
| k | −6.0523E−01 | 1.0181E+01 | 4.2957E+00 | −1.0000E+01 | 2.3527E+01 |
| A4 | 1.9962E−02 | 1.0418E−01 | 2.7997E−02 | −9.5919E−03 | −1.8032E−01 |
| A6 | 4.2031E−03 | −6.1854E−02 | 2.3301E−02 | 7.4146E−02 | 1.2208E−01 |
| A8 | 4.6325E−03 | 4.9069E−02 | −8.9512E−03 | 1.1861E−01 | −1.5279E−01 |
| A10 | −1.3777E−03 | −2.1584E−02 | 2.4365E−03 | −2.4589E−01 | 2.1272E−01 |
| A12 | 3.5743E−04 | 5.6490E−03 | 4.8768E−04 | 2.0683E−01 | −1.5424E−02 |
| A14 | 2.2893E−04 | 0.0000E+00 | 0.0000E+00 | −8.8088E−03 | −7.2295E−02 |
| A16 | 0.0000E+00 | 0.0000E+00 | 0.0000E+00 | 0.0000E+00 | 0.0000E+00 |

| Surface # | 7 | 8 | 9 | 10 | 11 |
|---|---|---|---|---|---|
| K: | −1.8135E−01 | 1.9493E+00 | −5.0000E+01 | −3.0000E+01 | −2.0000E+01 |
| A4 | −8.8499E−02 | −7.5393E−02 | −3.5025E−02 | −3.9059E−02 | −8.6329E−02 |
| A6 | 9.9194E−02 | −1.3434E−01 | −1.1187E−01 | 1.2092E−02 | 3.8703E−02 |
| A8 | −9.2829E−02 | 1.5506E−01 | 9.4998E−02 | 1.2999E−03 | −8.6820E−03 |
| A10 | 1.9704E−01 | −1.1419E−01 | −4.3387E−02 | −1.2530E−03 | 1.3232E−03 |
| A12 | −1.2990E−01 | 4.5922E−02 | 1.0455E−02 | 1.0145E−04 | −2.0814E−04 |
| A14 | 2.5869E−02 | −6.5868E−03 | −1.0803E−03 | 6.6988E−06 | 1.5698E−05 |
| A16 | 0.0000E+00 | 0.0000E+00 | 0.0000E+00 | 0.0000E+00 | 0.0000E+00 |

The units of the radius of curvature, the thickness and the focal length in table 1 are expressed in mm, the surface numbers 0-14 represent the surfaces sequentially arranged from the object-side to the image-side along the optical axis. In table 2, k represents the conic coefficient of the equation of the aspheric surface profiles, and A4-A16: represent the high-order aspheric coefficients. The tables presented below for each embodiment are the corresponding schematic parameter and aberration curves, and the definitions of the tables are the same as Table 1 and Table 2 of the first embodiment. Therefore, an explanation in this regard will not be provided again.

Figure 2A:
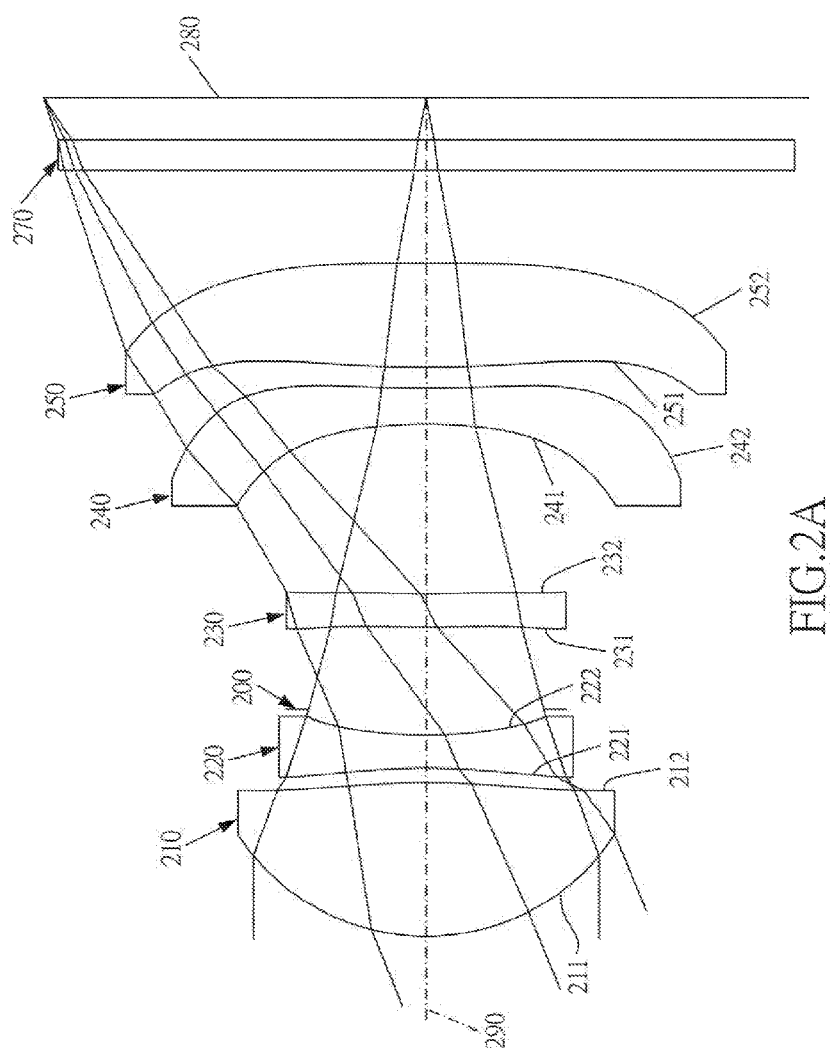
FIG. 2A shows an optical telephoto imaging lens in accordance with a second embodiment of the present invention.
Figure 2B:
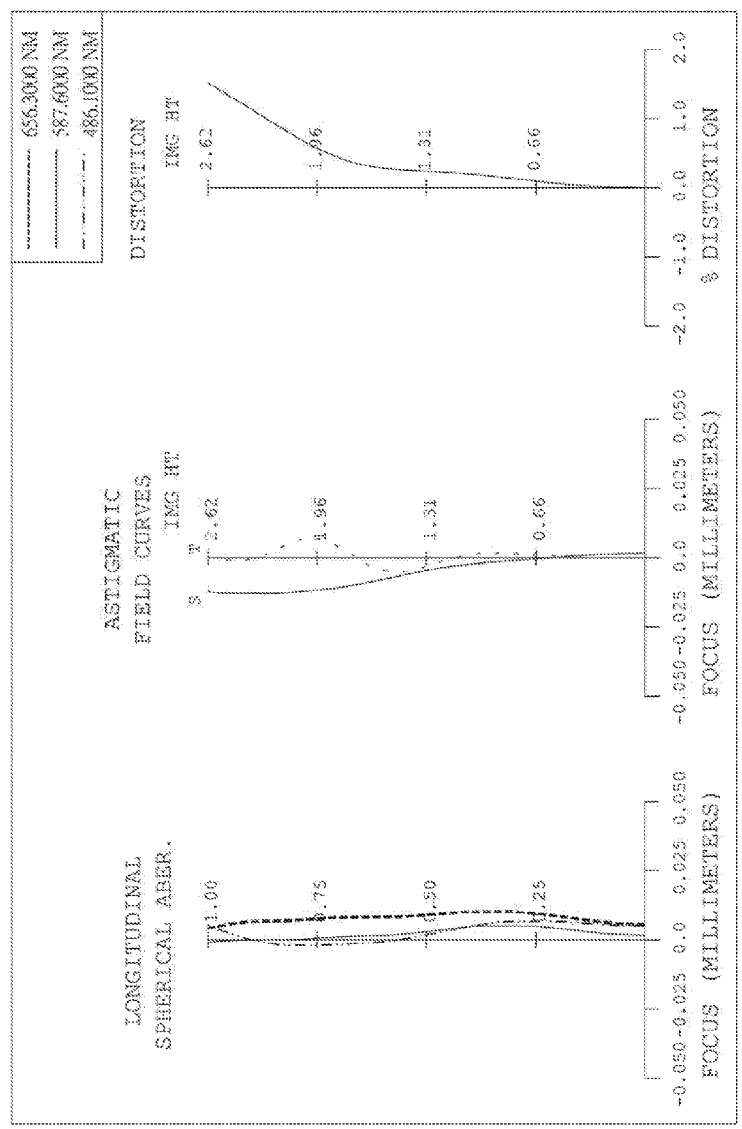
FIG. 2B shows the longitudinal spherical aberration curve, the astigmatic field curve and the distortion curve of the second embodiment of the present invention.

Referring to FIGS. 2A and 1B, FIG. 2A shows an optical telephoto imaging lens in accordance with a second embodiment of the present invention, and FIG. 2B shows, in order from left to right, the longitudinal spherical aberration curves, the astigmatic field curves, and the distortion curve of the second embodiment of the present invention. An optical telephoto imaging lens in accordance with the second embodiment of the present invention comprises an aperture stop 200 and a lens group. The lens group comprises, in order from an object side to the image side: a first lens element 210, a second lens element 220, a third lens element 230, a fourth lens element 240, a fifth lens element 250, an IR cut filter 270 which is made of glass, and an image plane 280, wherein the optical telephoto imaging lens has a total of five lens elements with refractive power. The aperture stop 200 is disposed between the second lens element 220 and the third lens element 230.

The first lens element 210 with a positive refractive power has an object-side surface 211 being convex near an optical axis 190 and an image-side surface 212 being convex near the optical axis 290, the object-side surface 211 and the image-side surface 212 are aspheric, and the first lens element 210 is made of plastic material.

The second lens element 220 with a negative refractive power has an object-side surface 221 being concave near the optical axis 290 and an image-side surface 222 being concave near the optical axis 290, the object-side surface 221 and the image-side surface 222 are aspheric, and the second lens element 220 is made of plastic material.

The third lens element 230 with a positive refractive power has an object-side surface 231 being convex near the optical axis 290 and an image-side surface 232 being concave near the optical axis 290, the object-side surface 231 and the image-side surface 232 are aspheric, the third lens element 230 is made of plastic material.

The fourth lens element 240 with a negative refractive power has an object-side surface 241 being concave near the optical axis 290 and an image-side surface 242 being concave near the optical axis 290, and the object-side surface 241 and the image-side surface 242 are aspheric, the fourth lens element 240 is made of plastic material.

The fifth lens element 250 with a positive refractive power has an object-side surface 251 being convex near the optical axis 290 and an image-side surface 252 being concave near the optical axis 290, the object-side surface 251 and the image-side surface 252 are aspheric, and the fifth lens element 250 is made of plastic material. In this embodiment, the object-side surface 251 of the fifth lens element 250 is concave at the periphery, namely, the object-side surface 251 of the fifth lens element 250 along the optical axis 290 to the periphery of the object-side surface 251 changes from convex to concave.

The IR cut filter 270 made of glass is located between the fifth lens element 250 and the image plane 280 and has no influence on the focal length of the telephoto imaging lens.

The detailed optical data of the second embodiment is shown in table 3, and the aspheric surface data is shown in table 4.

TABLE 3

Embodiment 2
f(focal length) = 6.39 mm, Fno = 2.7, HFOV = 22 deg.

| Surface | | Curvature Radius | | Thickness | Material | index | Abbe # | Focal length |
|---|---|---|---|---|---|---|---|---|
| 0 | object | Plane | | Infinity | | | | |
| 1 | lens 1 | 1.55 | (ASP) | 1.06 | plastic | 1.515 | 57.0 | 2.41 |
| 2 | | −4.78 | (ASP) | 0.10 | | | | |
| 3 | lens 2 | −4.62 | (ASP) | 0.23 | plastic | 1.607 | 26.5 | −3.05 |
| 4 | | 3.15 | (ASP) | 0.18 | | | | |
| 5 | aperture stop | plane | | 0.57 | | | | |
| 6 | lens 3 | 9.73 | (ASP) | 0.23 | plastic | 1.515 | 57.0 | 154.03 |
| 7 | | 11.00 | (ASP) | 1.18 | | | | |
| 8 | lens 4 | −3.53 | (ASP) | 0.25 | plastic | 1.545 | 56.0 | −4.95 |
| 9 | | 11.72 | (ASP) | 0.14 | | | | |
| 10 | lens 5 | 7.61 | (ASP) | 0.72 | plastic | 1.633 | 23.0 | 12.34 |
| 11 | | 290.56 | (ASP) | 0.64 | | | | |
| 12 | IR-filter | plane | | 0.21 | glass | 1.517 | 64.2 | — |
| 13 | | plane | | 0.29 | | | | |
| 14 | image | plane | | 0.00 | | | | |

* reference wavelength 587.6 nm

TABLE 4

Aspheric Coefficients

| Surface | 1 | 2 | 3 | 4 | 6 |
|---|---|---|---|---|---|
| k | −5.5856E−01 | 8.4804E+00 | −2.8578E+00 | −1.0000E+01 | 9.1380E+01 |
| A4 | 1.9528E−02 | 9.2824E−02 | 3.4597E−02 | 1.1790E−02 | −1.6942E−01 |
| A6 | 6.9084E−03 | −5.1334E−02 | 1.3586E−02 | 6.7348E−02 | 8.8133E−02 |
| A8 | 2.9312E−03 | 3.8858E−02 | −1.2909E−02 | 7.0561E−02 | −1.0477E−01 |
| A10 | −2.8089E−04 | −1.9591E−02 | 5.3593E−03 | −1.6056E−01 | 1.5659E−01 |
| A12 | 6.9336E−04 | 4.7635E−03 | 3.6184E−04 | 1.5318E−01 | −9.8514E−03 |
| A14 | 1.0404E−04 | 0.0000E+00 | 0.0000E+00 | −6.1907E−03 | −5.0807E−02 |
| A16 | 0.0000E+0 | 0.0000E+0 | 0.0000E+0 | 0.0000E+0 | 0.0000E+0 |

| Surface | 7 | 8 | 9 | 10 | 11 |
|---|---|---|---|---|---|
| k | −4.0000E+01 | −2.9281E−01 | −1.1553E+01 | −3.0000E+01 | −2.0000E+01 |
| A4 | −1.0598E−01 | −3.6009E−02 | 8.9173E−03 | −1.8859E−02 | −5.7514E−02 |
| A6 | 9.1565E−02 | −1.1270E−01 | −1.0294E−01 | 9.2757E−05 | 1.6455E−02 |
| A8 | −1.0458E−01 | 1.1159E−01 | 8.3624E−02 | −3.6933E−04 | −4.4119E−03 |
| A10 | 1.8048E−01 | −7.8384E−02 | −4.2093E−02 | −4.8484E−04 | 8.7504E−04 |

TABLE 4-continued

Aspheric Coefficients

| A12 | −9.6263E−02 | 3.1460E−02 | 1.1254E−02 | 7.5275E−05 | −1.5443E−04 |
|---|---|---|---|---|---|
| A14 | 1.7128E−02 | −6.2499E−03 | −1.3502E−03 | 4.7078E−06 | 1.1032E−05 |
| A16 | 0.0000E+0 | 0.0000E+0 | 2.5789E−05 | 0.0000E+0 | 0.0000E+0 |

In the second embodiment, the equation of the aspheric surface profiles of the aforementioned lens elements is the same as the equation of the first embodiment. Also, the definitions of these parameters shown in the following table are the same as those stated in the first embodiment with corresponding values for the second embodiment, so an explanation in this regard will not be provided again.

Moreover, these parameters can be calculated from Table 3 and Table 4 as the following values and satisfy the following conditions:

Embodiment 2

| f | 6.39 | V3-V2 | 30.5 |
|---|---|---|---|
| Fno | 2.70 | V3-V5 | 34.0 |
| FOV | 44 | SD/TD | 0.66 |
| \| f5 \| | 12.34 | f1/f | 0.38 |
| \| f3 \| | 154.03 | \| 1/f3 \| + \| 1/f5 \| | 0.09 |
| \| f4 \| | 4.95 | \| f/R9 \| | 0.84 |
| \| f2 \| | 3.05 | TTL/f | 0.91 |
| \| f1 \| | 2.41 | (R1 + R2)/(R1 − R2) | −0.51 |
| (R3 + R4)/(R3 − R4) | 0.19 | f4/f | −0.78 |

Figure 3A:
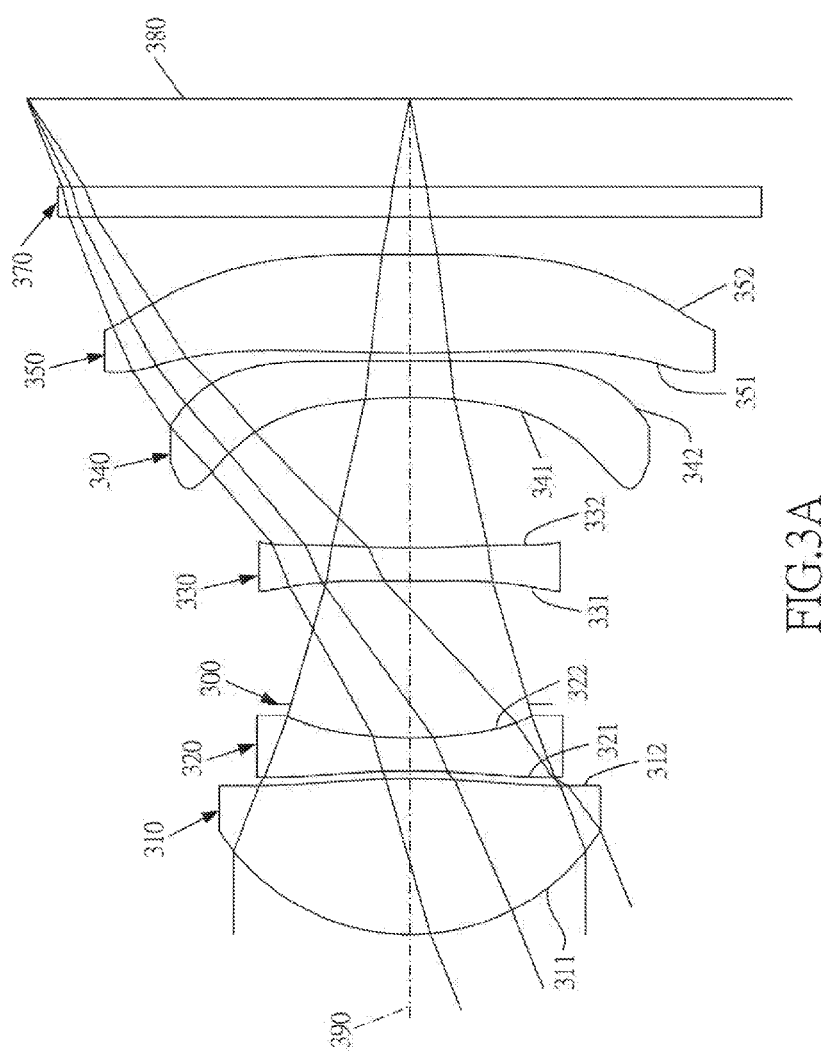
FIG. 3A shows an optical telephoto imaging lens in accordance with a third embodiment of the present invention.
Figure 3B:
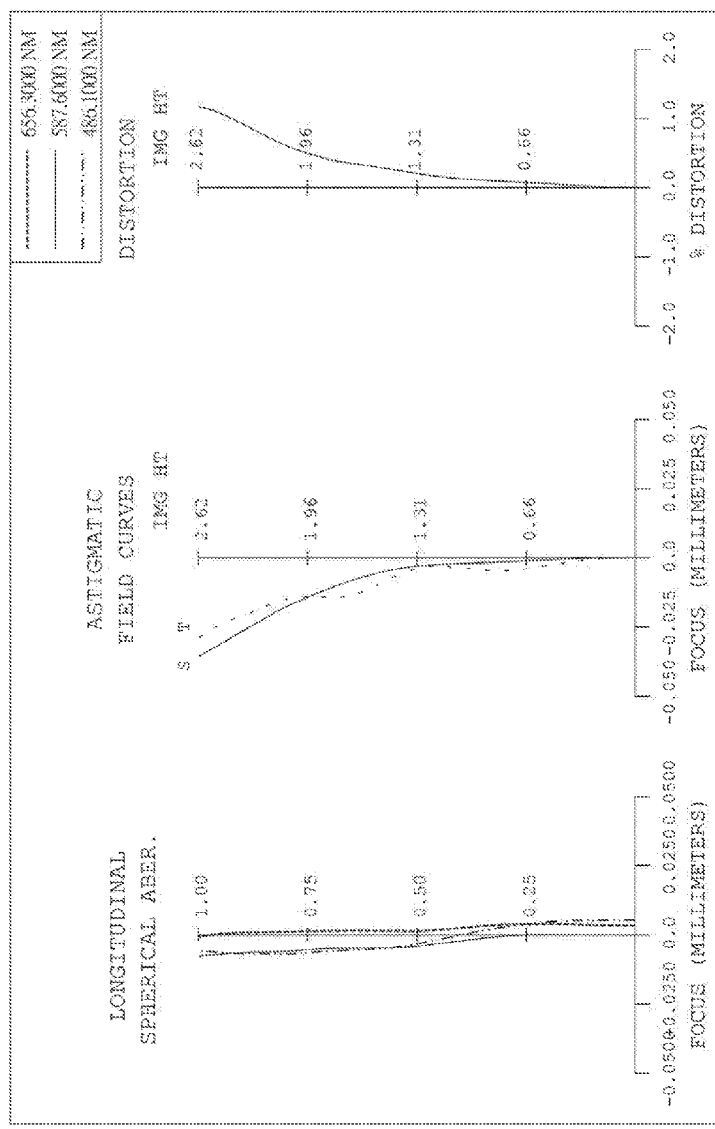
FIG. 3B shows the longitudinal spherical aberration curve, the astigmatic field curve and the distortion curve of the third embodiment of the present invention.

Referring to FIGS. 3A and 3B, FIG. 3A shows an optical telephoto imaging lens in accordance with a third embodiment of the present invention, and FIG. 3B shows, in order from left to right, the longitudinal spherical aberration curves, the astigmatic field curves, and the distortion curve of the third embodiment of the present invention. An optical telephoto imaging lens in accordance with the third embodiment of the present invention comprises an aperture stop 300 and a lens group. The lens group comprises, in order from an object side to the image side: a first lens element 310, a second lens element 320, a third lens element 330, a fourth lens element 340, a fifth lens element 350, an IR cut filter 370 which is made of glass, and an image plane 380, wherein the optical telephoto imaging lens has a total of five lens elements with refractive power. The aperture stop 300 is disposed between the second lens element 320 and the third lens element 330.

The first lens element 310 with a positive refractive power has an object-side surface 311 being convex near an optical axis 390 and an image-side surface 312 being convex near the optical axis 390, the object-side surface 311 and the image-side surface 312 are aspheric, and the first lens element 310 is made of plastic material.

The second lens element 320 with a negative refractive power has an object-side surface 321 being concave near the optical axis 390 and an image-side surface 322 being concave near the optical axis 390, the object-side surface 321 and the image-side surface 322 are aspheric, and the second lens element 320 is made of plastic material.

The third lens element 330 with a negative refractive power has an object-side surface 331 being convex near the optical axis 390 and an image-side surface 332 being concave near the optical axis 390, the object-side surface 331 and the image-side surface 332 are aspheric, the third lens element 330 is made of plastic material.

The fourth lens element 340 with a negative refractive power has an object-side surface 341 being concave near the optical axis 390 and an image-side surface 342 being convex near the optical axis 390, and the object-side surface 341 and the image-side surface 342 are aspheric, the fourth lens element 340 is made of plastic material.

The fifth lens element 350 with a positive refractive power has an object-side surface 351 being convex near the optical axis 390 and an image-side surface 352 being concave near the optical axis 390, the object-side surface 351 and the image-side surface 352 are aspheric, and the fifth lens element 350 is made of plastic material. In this embodiment, the object-side surface 351 of the fifth lens element 350 is concave at the periphery, namely, the object-side surface 351 of the fifth lens element 350 along the optical axis 390 to a periphery of the object-side surface 351 changes from convex to concave.

The IR cut filter 370 made of glass is located between the fifth lens element 350 and the image plane 380 and has no influence on the focal length of the telephoto imaging lens.

The detailed optical data of the third embodiment is shown in table 5, and the aspheric surface data is shown in table 6.

TABLE 5

Embodiment 3 f(focal length) = 6.5 mm, Fno = 2.7, HFOV = 21.75 deg.

| Surface | | Curvature Radius | Thickness | Material | index | Abbe # | Focal length |
|---|---|---|---|---|---|---|---|
| 0 | object | Plane | Infinity | | | | |
| 1 | lens 1 | 1.56 (ASP) | 1.08 | plastic | 1.535 | 56.0 | 2.34 |
| 2 | | −4.81 (ASP) | 0.05 | | | | |
| 3 | lens 2 | −5.50 (ASP) | 0.23 | plastic | 1.609 | 26.0 | −3.11 |
| 4 | | 2.93 (ASP) | 0.23 | | | | |
| 5 | aperture stop | plane | 0.85 | | | | |
| 6 | lens 3 | 12.98 (ASP) | 0.23 | plastic | 1.535 | 56.0 | −15.92 |
| 7 | | 5.11 (ASP) | 1.04 | | | | |
| 8 | lens 4 | −3.32 (ASP) | 0.25 | plastic | 1.545 | 56.0 | −6.75 |
| 9 | | −35.18 (ASP) | 0.06 | | | | |
| 10 | lens 5 | 9.20 (ASP) | 0.68 | plastic | 1.643 | 22.0 | 15.61 |
| 11 | | 108.00 (ASP) | 0.26 | | | | |
| 12 | IR-filter | plane | 0.21 | glass | 1.517 | 64.2 | — |
| 13 | | plane | 0.61 | | | | |
| 14 | image | plane | 0.00 | | | | |

* reference wavelength 587.6 nm

TABLE 6

Aspheric Coefficients

| Surface | 1 | 2 | 3 | 4 | 6 |
|---|---|---|---|---|---|
| k | −4.8212E−01 | 7.3648E+00 | −5.3209E+00 | −1.0000E+01 | −3.9452E+01 |
| A4 | 1.6594E−02 | 8.9790E−02 | 3.8395E−02 | 4.5170E−02 | −1.9681E−01 |
| A6 | 5.5809E−03 | −4.2933E−02 | 1.5821E−02 | 4.8673E−02 | 8.6147E−02 |
| A8 | 2.5888E−03 | 3.2145E−02 | −1.3972E−02 | 6.4521E−02 | −3.2731E−02 |
| A10 | −2.1584E−04 | −1.5469E−02 | 5.0034E−03 | −1.2341E−01 | 4.4601E−02 |
| A12 | 4.8463E−04 | 3.4699E−03 | 2.5795E−04 | 1.0435E−01 | 2.5695E−02 |
| A14 | 1.4750E−04 | 0.0000E+00 | 0.0000E+00 | 7.3002E−03 | −3.1510E−02 |
| A16 | 0.0000E+00 | 0.0000E+00 | 0.0000E+00 | 0.0000E+00 | 0.0000E+00 |

| Surface | 7 | 8 | 9 | 10 | 11 |
|---|---|---|---|---|---|
| k | −2.1299E+01 | 3.0810E+00 | 3.0451E+01 | −3.0000E+01 | −2.0000E+01 |
| A4 | −1.4614E−01 | 4.2001E−01 | 5.1607E−02 | −5.1400E−02 | −7.7041E−02 |
| A6 | 1.0288E−01 | −1.4166E−01 | −1.1152E−01 | 3.2509E−02 | 2.3570E−02 |
| A8 | −6.8874E−02 | 9.6919E−02 | 7.1479E−02 | −1.6724E−02 | −3.9972E−03 |
| A10 | 1.1407E−01 | −3.4081E−02 | −3.1721E−02 | 3.8515E−03 | −3.2628E−04 |
| A12 | −6.6362E−02 | 8.8853E−04 | 7.9845E−03 | −2.9981E−04 | 3.0058E−04 |
| A14 | 1.4714E−02 | 2.1188E−03 | −1.0383E−03 | 2.2826E−07 | −5.8486E−05 |
| A16 | 0.0000E+00 | 0.0000E+00 | 5.2267E−05 | 0.0000E+00 | 4.6753E−06 |

In the third embodiment, the equation of the aspheric surface profiles of the aforementioned lens elements is the same as the equation of the first embodiment. Also, the definitions of these parameters shown in the following table are the same as those stated in the first embodiment with corresponding values for the second embodiment, so an explanation in this regard will not be provided again.

Moreover, these parameters can be calculated from Table 5 and Table 6 as the following values and satisfy the following conditions:

| Embodiment 3 | | | |
|---|---|---|---|
| f | 6.50 | V3−V2 | 30.0 |
| Fno | 2.70 | V3−V5 | 34.0 |
| FOV | 43.50 | SD/TD | 0.66 |
| \| f5 \| | 15.61 | f1/f | 0.36 |
| \| f3 \| | 15.92 | \| 1/f3 \| + \| 1/f5 \| | 0.13 |
| \| f4 \| | 6.75 | \| f/R9 \| | 0.71 |
| \| f2 \| | 3.11 | TTL/f | 0.89 |
| \| f1 \| | 2.34 | (R1 + R2)/(R1 − R2) | −0.51 |
| (R3 + R4)/(R3 − R4) | 0.30 | f4/f | −1.04 |

Figure 4A:
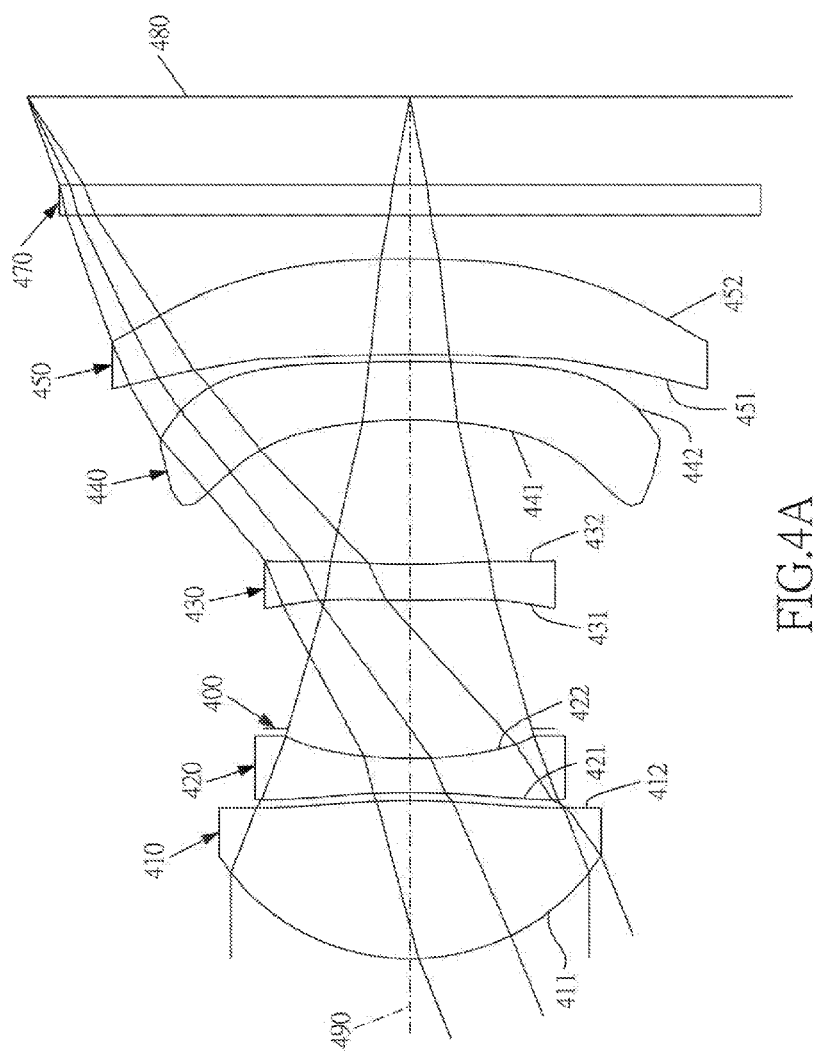
FIG. 4A shows an optical telephoto imaging lens in accordance with a fourth embodiment of the present invention.
Figure 4B:
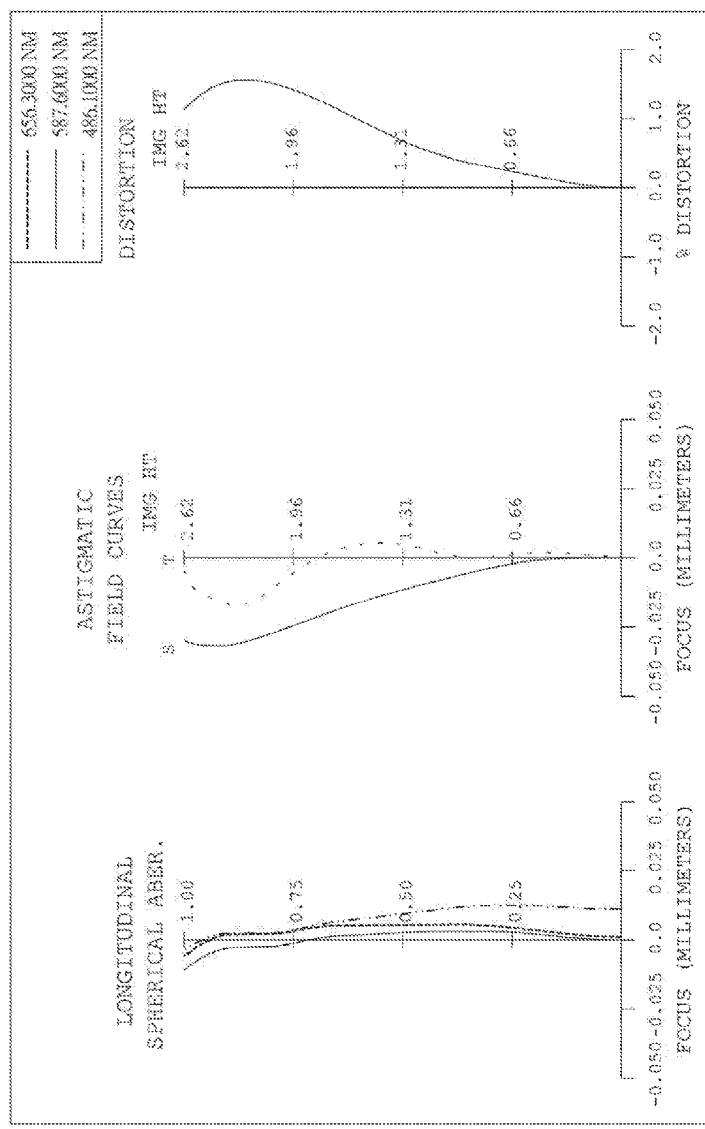
FIG. 4B shows the longitudinal spherical aberration curve, the astigmatic field curve and the distortion curve of the fourth embodiment of the present invention.

Referring to FIGS. 4A and 4B, FIG. 4A shows an optical telephoto imaging lens in accordance with a fourth embodiment of the present invention, and FIG. 4B shows, in order from left to right, the longitudinal spherical aberration curves, the astigmatic field curves, and the distortion curve of the fourth embodiment of the present invention. An optical telephoto imaging lens in accordance with the fourth embodiment of the present invention comprises an aperture stop 400 and a lens group. The lens group comprises, in order from an object side to the image side: a first lens element 410, a second lens element 420, a third lens element 430, a fourth lens element 440, a fifth lens element 450, an IR cut filter 470 which is made of glass, and an image plane 480, wherein the optical telephoto imaging lens has a total of five lens elements with refractive power. The aperture stop 400 is disposed between the second lens element 420 and the third lens element 430.

The first lens element 410 with a positive refractive power has an object-side surface 411 being convex near an optical axis 490 and an image-side surface 412 being convex near the optical axis 490, the object-side surface 411 and the image-side surface 412 are aspheric, and the first lens element 410 is made of plastic material.

The second lens element 420 with a negative refractive power has an object-side surface 421 being concave near the optical axis 490 and an image-side surface 422 being concave near the optical axis 490, the object-side surface 421 and the image-side surface 422 are aspheric, and the second lens element 420 is made of plastic material.

The third lens element 430 with a negative refractive power has an object-side surface 431 being convex near the optical axis 490 and an image-side surface 432 being concave near the optical axis 490, the object-side surface 431 and the image-side surface 432 are aspheric, the third lens element 430 is made of plastic material.

The fourth lens element 440 with a negative refractive power has an object-side surface 441 being concave near the optical axis 490 and an image-side surface 442 being convex near the optical axis 490, and the object-side surface 441 and the image-side surface 442 are aspheric, the fourth lens element 440 is made of plastic material.

The fifth lens element 450 with a positive refractive power has an object-side surface 451 being concave near the optical axis 490 and an image-side surface 452 being convex near the optical axis 490, the object-side surface 451 and the image-side surface 452 are aspheric, and the fifth lens element 450 is made of plastic material. In this embodiment, the object-side surface 451 of the fifth lens element 450 is concave at the periphery.

The IR cut filter 470 made of glass is located between the fifth lens element 450 and the image plane 480 and has no influence on the focal length of the telephoto imaging lens.

The detailed optical data of the fourth embodiment is shown in table 7, and the aspheric surface data is shown in table 8.

TABLE 7

Embodiment 4
f(focal length) = 6.49 mm, Fno = 2.65, HFOV = 21.76 deg.

| Surface | | Curvature Radius | Thickness | Material | index | Abbe # | Focal length |
|---|---|---|---|---|---|---|---|
| 0 | object | Plane | Infinity | | | | |
| 1 | lens 1 | 1.58 (ASP) | 1.09 | plastic | 1.535 | 56.0 | 2.35 |

TABLE 7-continued

Embodiment 4
f(focal length) = 6.49 mm, Fno = 2.65, HFOV = 21.76 deg.

| Surface | | Curvature Radius | | Thickness | Material | index | Abbe # | Focal length |
|---|---|---|---|---|---|---|---|---|
| 2 | | −4.72 | (ASP) | 0.06 | | | | |
| 3 | lens 2 | −4.95 | (ASP) | 0.24 | plastic | 1.609 | 26.0 | −3.02 |
| 4 | | 2.97 | (ASP) | 0.21 | | | | |
| 5 | aperture stop | plane | | 0.89 | | | | |
| 6 | lens 3 | 7.54 | (ASP) | 0.25 | plastic | 1.535 | 56.0 | −20.84 |
| 7 | | 4.44 | (ASP) | 1.00 | | | | |
| 8 | lens 4 | −3.37 | (ASP) | 0.40 | plastic | 1.545 | 56.0 | −9.52 |
| 9 | | −10.02 | (ASP) | 0.05 | | | | |
| 10 | lens 5 | −50.11 | (ASP) | 0.66 | plastic | 1.643 | 22.0 | 17.02 |
| 11 | | −9.02 | (ASP) | 0.30 | | | | |
| 12 | IR-filter | plane | | 0.21 | glass | 1.517 | 64.2 | — |
| 13 | | plane | | 0.61 | | | | |
| 14 | image | plane | | 0.00 | | | | |

* reference wavelength 587.6 nm

TABLE 8

Aspheric Coefficients

| Surface | 1 | 2 | 3 | 4 | 6 |
|---|---|---|---|---|---|
| k | −4.8295E−01 | 7.0386E+00 | −5.7548E+00 | −1.0000E+01 | −4.5294E+01 |
| A4 | 1.6497E−02 | 9.0404E−02 | 3.8634E−02 | 4.1979E−02 | −2.0157E−01 |
| A6 | 5.4238E−03 | −4.2379E−02 | 1.6330E−02 | 4.9234E−02 | 7.6486E−02 |
| A8 | 2.6117E−03 | 3.1880E−02 | −1.3584E−02 | 6.5098E−02 | −3.7130E−02 |
| A10 | −2.5816E−04 | −1.5014E−02 | 5.3068E−03 | −1.2075E−01 | 5.5969E−02 |
| A12 | 4.2825E−04 | 3.4597E−03 | 2.5183E−04 | 1.0187E−01 | 2.5086E−02 |
| A14 | 1.3094E−04 | 0.0000E+00 | 0.0000E+00 | 7.0959E−03 | −3.0628E−02 |
| A16 | 0.0000E+00 | 0.0000E+00 | 0.0000E+00 | 0.0000E+00 | 0.0000E+00 |

| Surface | 7 | 8 | 9 | 10 | 11 |
|---|---|---|---|---|---|
| k | −2.1992E+01 | 2.8645E+00 | 3.0451E+01 | −3.0000E+01 | −2.0000E+01 |
| A4 | −1.5505E−01 | 3.3912E−02 | 7.1367E−02 | −3.2413E−02 | −6.5544E−02 |
| A6 | 9.1722E−02 | −1.3570E−01 | −1.1075E−01 | 3.0347E−02 | 2.2633E−02 |
| A8 | −6.8924E−02 | 9.8156E−02 | 7.0262E−02 | −2.0526E−02 | −3.9317E−03 |
| A10 | 1.1690E−01 | −3.2335E−02 | −3.0980E−02 | 6.0836E−03 | −3.1669E−04 |
| A12 | −6.4292E−02 | 7.4846E−04 | 7.9217E−03 | −7.7994E−04 | 2.9277E−04 |
| A14 | 1.4302E−02 | 1.6483E−03 | −1.0093E−03 | 3.6759E−05 | −5.6791E−05 |
| A16 | 0.0000E+00 | 0.0000E+00 | 4.2021E−05 | 0.0000E+00 | 4.4689E−06 |

In the fourth embodiment, the equation of the aspheric surface profiles of the aforementioned lens elements is the same as the equation of the first embodiment. Also, the definitions of these parameters shown in the following table are the same as those stated in the first embodiment with corresponding values for the second embodiment, so an explanation in this regard will not be provided again.

Moreover, these parameters can be calculated from Table 7 and Table 8 as the following values and satisfy the following conditions:

| Embodiment 4 | | | |
|---|---|---|---|
| f | 6.49 | V3-V2 | 30.0 |
| Fno | 2.65 | V3-V5 | 34.0 |
| FOV | 43.52 | SD/TD | 0.67 |
| \| f5 \| | 17.02 | f1/f | 0.36 |
| \| f3 \| | 20.84 | \| 1/f3 \| + \| 1/f5 \| | 0.11 |
| \| f4 \| | 9.52 | \| f/R9 \| | 0.13 |
| \| f2 \| | 3.02 | TTL/f | 0.92 |
| \| f1 \| | 2.35 | (R1 + R2)/(R1 − R2) | −0.50 |
| (R3 + R4)/(R3 − R4) | 0.25 | f4/f | −1.47 |

Figure 5A:
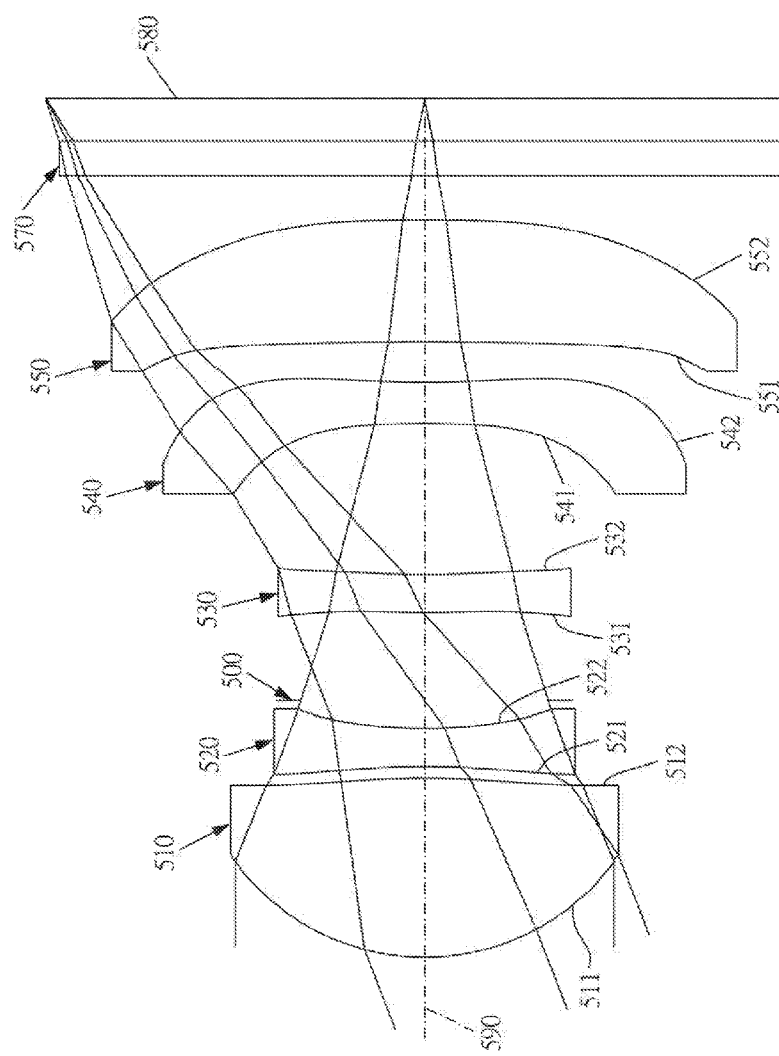
FIG. 5A shows an optical telephoto imaging lens in accordance with a fifth embodiment of the present invention.
Figure 5B:
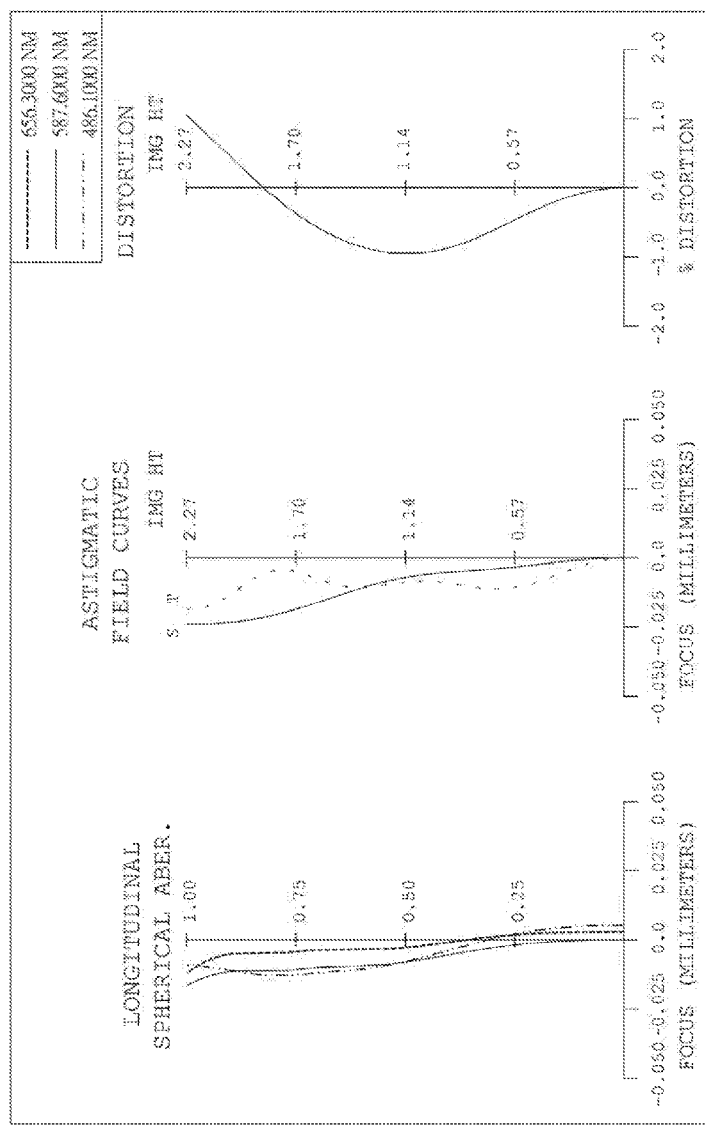
FIG. 5B shows the longitudinal spherical aberration curve, the astigmatic field curve and the distortion curve of the fifth embodiment of the present invention.

Referring to FIGS. 5A and 5B, FIG. 5A shows an optical telephoto imaging lens in accordance with a fifth embodiment of the present invention, and FIG. 5B shows, in order from left to right, the longitudinal spherical aberration curves, the astigmatic field curves, and the distortion curve of the fifth embodiment of the present invention. An optical telephoto imaging lens in accordance with the fifth embodiment of the present invention comprises an aperture stop 500 and a lens group. The lens group comprises, in order from an object side to the image side: a first lens element 510, a second lens element 520, a third lens element 530, a fourth lens element 540, a fifth lens element 550, an IR cut filter 570 which is made of glass, and an image plane 580, wherein the optical telephoto imaging lens has a total of five lens elements with refractive power. The aperture stop 500 is disposed between the second lens element 520 and the third lens element 530.

The first lens element 510 with a positive refractive power has an object-side surface 511 being convex near an optical axis 590 and an image-side surface 512 being convex near the optical axis 590, the object-side surface 511 and the image-side surface 512 are aspheric, and the first lens element 510 is made of plastic material.

The second lens element 520 with a negative refractive power has an object-side surface 521 being concave near the optical axis 590 and an image-side surface 522 being concave near the optical axis 590, the object-side surface 521 and the image-side surface 522 are aspheric, and the second lens element 520 is made of plastic material.

The third lens element 530 with a negative refractive power has an object-side surface 531 being convex near the optical axis 590 and an image-side surface 532 being concave near the optical axis 590, the object-side surface 531 and the image-side surface 532 are aspheric, the third lens element 530 is made of plastic material.

The fourth lens element 540 with a negative refractive power has an object-side surface 541 being concave near the optical axis 590 and an image-side surface 542 being concave near the optical axis 590, and the object-side surface 541 and the image-side surface 542 are aspheric, the fourth lens element 540 is made of plastic material.

The fifth lens element 550 with a positive refractive power has an object-side surface 551 being concave near the optical axis 590 and an image-side surface 552 being convex near the optical axis 590, the object-side surface 551 and the image-side surface 552 are aspheric, and the fifth lens element 550 is made of plastic material. In this embodiment, the object-side surface 551 of the fifth lens element 550 is concave at the periphery.

The IR cut filter 570 made of glass is located between the fifth lens element 550 and the image plane 580 and has no influence on the focal length of the telephoto imaging lens.

The detailed optical data of the fifth embodiment is shown in table 9, and the aspheric surface data is shown in table 10.

TABLE 9

Embodiment 5
f(focal length) = 5.9 mm, Fno = 2.6, HFOV = 20.89 deg.

| Surface | | Curvature Radius | Thickness | Material | index | Abbe # | Focal length |
|---|---|---|---|---|---|---|---|
| 0 | object | Plane | Infinity | | | | |
| 1 | lens 1 | 1.40 (ASP) | 1.08 | plastic | 1.515 | 57.0 | 2.20 |
| 2 | | −4.37 (ASP) | 0.07 | | | | |
| 3 | lens 2 | −4.60 (ASP) | 0.23 | plastic | 1.615 | 25.0 | −2.91 |
| 4 | | 2.99 (ASP) | 0.17 | | | | |
| 5 | aperture stop | plane | 0.53 | | | | |
| 6 | lens 3 | 7.91 (ASP) | 0.23 | plastic | 1.545 | 56.0 | −30.02 |
| 7 | | 5.27 (ASP) | 0.91 | | | | |
| 8 | lens 4 | −6.81 (ASP) | 0.25 | plastic | 1.545 | 56.0 | −5.96 |
| 9 | | 6.27 (ASP) | 0.24 | | | | |
| 10 | lens 5 | −23.72 (ASP) | 0.74 | plastic | 1.633 | 23.0 | 256.60 |
| 11 | | −20.95 (ASP) | 0.27 | | | | |
| 12 | IR-filter | plane | 0.21 | glass | 1.517 | 64.2 | — |
| 13 | | plane | 0.26 | | | | |
| 14 | image | plane | 0.00 | | | | |

* reference wavelength 587.6 nm

TABLE 10

| Aspheric Coefficients | | | | | |
|---|---|---|---|---|---|
| Surface | 1 | 2 | 3 | 4 | 6 |
| k | −5.8732E−01 | 8.2531E+00 | −4.5120E+00 | −1.0000E+01 | 7.5231E+00 |
| A4 | 2.5692E−02 | 1.2985E−01 | 4.9161E−02 | 1.2739E−02 | −2.2463E−01 |
| A6 | 8.3490E−03 | −8.6917E−02 | 2.1254E−02 | 1.2162E−01 | 1.7012E−01 |
| A8 | 7.2297E−03 | 8.1045E−02 | −3.0069E−02 | 1.1759E−01 | −2.7310E−01 |
| A10 | −1.8779E−03 | −5.0788E−02 | 1.4132E−02 | −4.1232E−01 | 4.2793E−01 |
| A12 | 1.3609E−03 | 1.4639E−02 | 1.1531E−03 | 4.8813E−01 | −3.1393E−02 |
| A14 | 7.6336E−04 | 0.0000E+00 | 0.0000E+00 | −2.4355E−02 | −1.9988E−01 |
| A16 | 0.0000E+00 | 0.0000E+00 | 0.0000E+00 | 0.0000E+00 | 0.0000E+00 |
| Surface | 7 | 8 | 9 | 10 | 11 |
| k | −1.2345E+01 | 1.2317E+01 | −4.1056E+01 | −3.0000E+01 | −2.0000E+01 |
| A4 | −1.4955E−01 | −1.1925E−01 | −1.3694E−02 | 2.1519E−03 | −9.5332E−02 |
| A6 | 1.6440E−01 | −1.6357E−01 | −1.4655E−01 | 7.8840E−04 | 3.6875E−02 |
| A8 | −2.3204E−01 | 2.4355E−01 | 1.7228E−01 | −5.4721E−04 | −1.0355E−02 |
| A10 | 4.3961E−01 | −2.0889E−01 | −1.1071E−01 | −1.4627E−03 | 2.3578E−03 |
| A12 | −3.0676E−01 | 9.3651E−02 | 3.5971E−02 | 2.3987E−04 | −4.9212E−04 |
| A14 | 6.7382E−02 | −1.9744E−02 | −5.2263E−03 | 1.8521E−05 | 4.3402E−05 |
| A16 | 0.0000E+00 | 0.0000E+00 | 1.2526E−04 | 0.0000E+00 | 0.0000E+00 |

| Embodiment 5 | | | |
|---|---|---|---|
| f | 5.90 | V3-V2 | 31.0 |
| Fno | 2.60 | V3-V5 | 33.0 |
| FOV | 41.78 | SD/TD | 0.65 |
| \| f5 \| | 256.60 | f1/f | 0.37 |
| \| f3 \| | 30.02 | \| 1/f3 \| + \| 1/f5 \| | 0.04 |
| \| f4 \| | 5.96 | \| f/R9 \| | 0.25 |
| \| f2 \| | 2.91 | TTL/f | 0.88 |
| \| f1 \| | 2.20 | (R1 + R2)/(R1 − R2) | −0.51 |
| (R3 + R4)/(R3 − R4) | 0.21 | f4/f | −1.01 |

Figure 6A:
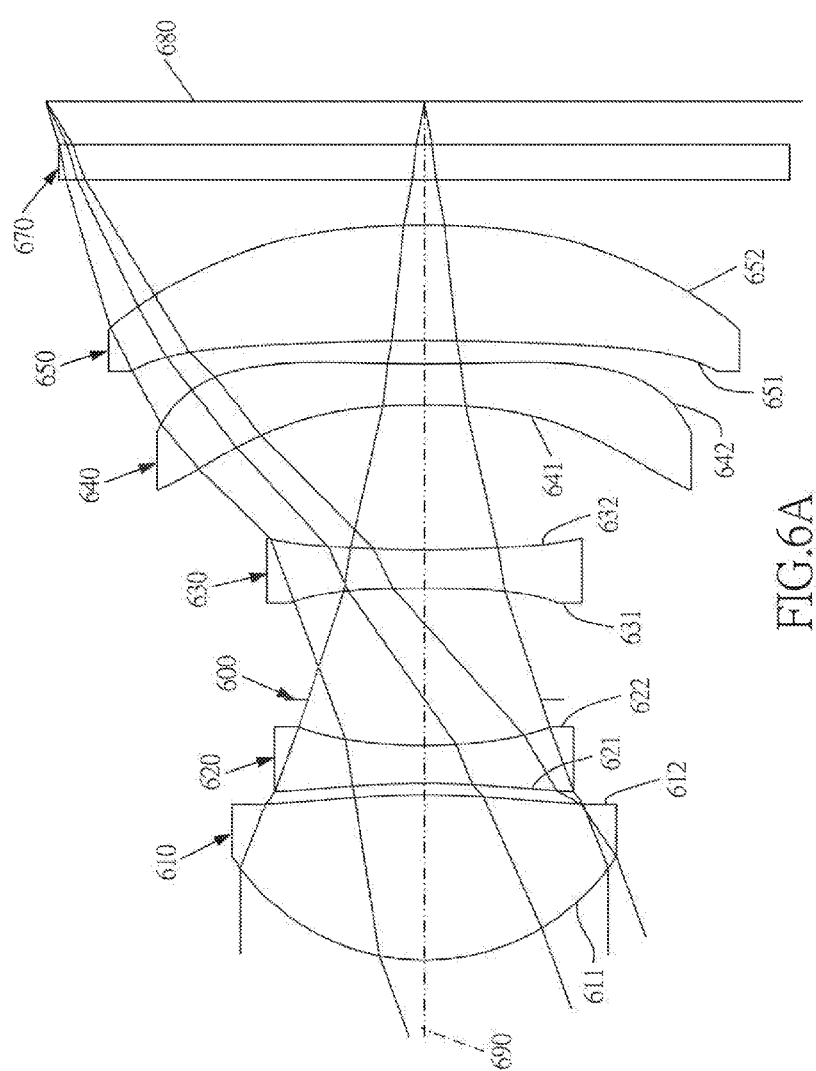
FIG. 6A shows an optical telephoto imaging lens in accordance with a sixth embodiment of the present invention.
Figure 6B:
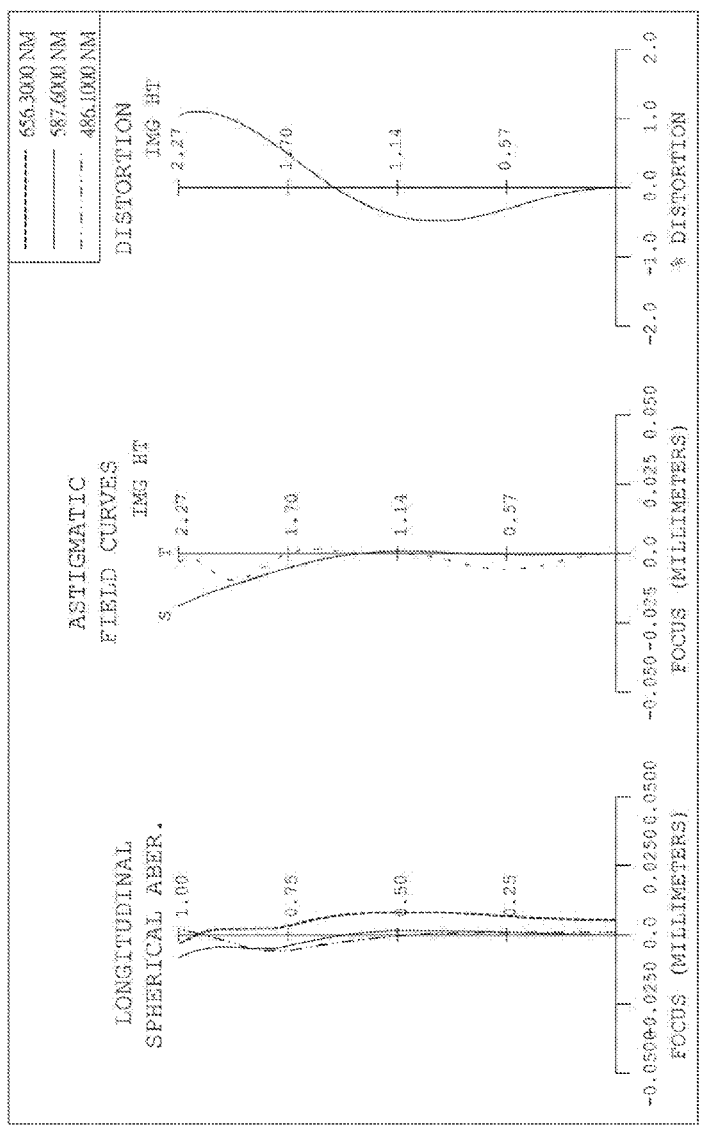
FIG. 6B shows the longitudinal spherical aberration curve, the astigmatic field curve and the distortion curve of the sixth embodiment of the present invention.

Referring to FIGS. 6A and 6B, FIG. 6A shows an optical telephoto imaging lens in accordance with a sixth embodiment of the present invention, and FIG. 6B shows, in order from left to right, the longitudinal spherical aberration curves, the astigmatic field curves, and the distortion curve of the sixth embodiment of the present invention. An optical telephoto imaging lens in accordance with the sixth embodiment of the present invention comprises an aperture stop 600 and a lens group. The lens group comprises, in order from an object side to the image side: a first lens element 610, a second lens element 620, a third lens element 630, a fourth lens element 640, a fifth lens element 650, an IR cut filter 670 which is made of glass, and an image plane 680, wherein the optical telephoto imaging lens has a total of five lens elements with refractive power. The aperture stop 600 is disposed between the second lens element 620 and the third lens element 630.

The first lens element 610 with a positive refractive power has an object-side surface 611 being convex near an optical axis 690 and an image-side surface 612 being convex near the optical axis 690, the object-side surface 611 and the image-side surface 612 are aspheric, and the first lens element 610 is made of plastic material.

The second lens element 620 with a negative refractive power has an object-side surface 621 being concave near the In the fifth embodiment, the equation of the aspheric surface profiles of the aforementioned lens elements is the same as the equation of the first embodiment. Also, the definitions of these parameters shown in the following table are the same as those stated in the first embodiment with corresponding values for the second embodiment, so an explanation in this regard will not be provided again.

Moreover, these parameters can be calculated from Table 9 and Table 10 as the following values and satisfy the following conditions:

optical axis 690 and an image-side surface 622 being concave near the optical axis 690, the object-side surface 621 and the image-side surface 622 are aspheric, and the second lens element 620 is made of plastic material.

The third lens element 630 with a negative refractive power has an object-side surface 631 being concave near the optical axis 690 and an image-side surface 632 being concave near the optical axis 690, the object-side surface 631 and the image-side surface 632 are aspheric, the third lens element 630 is made of plastic material.

The fourth lens element 640 with a negative refractive power has an object-side surface 641 being concave near the optical axis 690 and an image-side surface 642 being concave near the optical axis 690, and the object-side surface 641 and the image-side surface 642 are aspheric, the fourth lens element 640 is made of plastic material.

The fifth lens element 650 with a positive refractive power has an object-side surface 651 being concave near the optical axis 690 and an image-side surface 652 being convex near the optical axis 690, the object-side surface 651 and the image-side surface 652 are aspheric, and the fifth lens element 650 is made of plastic material. In this embodiment, the object-side surface 651 of the fifth lens element 650 is concave at the periphery.

The IR cut filter 670 made of glass is located between the fifth lens element 650 and the image plane 680 and has no influence on the focal length of the telephoto imaging lens.

The detailed optical data of the sixth embodiment is shown in table 11, and the aspheric surface data is shown in table 12.

TABLE 11

Embodiment 6
f(focal length) = 6.17 mm, Fno = 2.8, HFOV = 20 deg.

| Surface | | Curvature Radius | | Thickness | Material | index | Abbe # | Focal length |
|---|---|---|---|---|---|---|---|---|
| 0 | object | Plane | | Infinity | | | | |
| 1 | lens 1 | 1.36 | (ASP) | 1.00 | plastic | 1.515 | 57.0 | 2.14 |
| 2 | | −4.36 | (ASP) | 0.07 | | | | |
| 3 | lens 2 | −4.99 | (ASP) | 0.23 | plastic | 1.615 | 25.0 | −3.07 |
| 4 | | 3.08 | (ASP) | 0.28 | | | | |
| 5 | aperture stop | plane | | 0.67 | | | | |
| 6 | lens 3 | −15.46 | (ASP) | 0.23 | plastic | 1.545 | 56.0 | −7.84 |
| 7 | | 5.92 | (ASP) | 0.88 | | | | |
| 8 | lens 4 | −4.27 | (ASP) | 0.25 | plastic | 1.545 | 56.0 | −5.88 |
| 9 | | 13.07 | (ASP) | 0.14 | | | | |
| 10 | lens 5 | −14.18 | (ASP) | 0.70 | plastic | 1.633 | 23.0 | 15.43 |
| 11 | | −5.89 | (ASP) | 0.27 | | | | |
| 12 | IR-filter | plane | | 0.21 | glass | 1.517 | 64.2 | — |
| 13 | | plane | | 0.27 | | | | |
| 14 | image | plane | | 0.00 | | | | |

* reference wavelength 587.6 nm

TABLE 12

| Aspheric Coefficients | | | | | |
|---|---|---|---|---|---|
| Surface | 1 | 2 | 3 | 4 | 6 |
| k | −5.3027E−01 | 8.0465E+00 | −3.6678E+00 | −1.0000E+01 | 2.5000E+01 |
| A4 | 2.3168E−02 | 1.0322E−01 | 3.9150E−02 | 3.6327E−02 | −2.1361E−01 |
| A6 | 9.7605E−03 | −5.7069E−02 | 1.4266E−02 | 8.9778E−02 | 1.4456E−01 |
| A8 | 5.8968E−03 | 4.8944E−02 | −1.5322E−02 | 3.9098E−02 | −1.5225E−01 |
| A10 | −6.2152E−04 | −2.7560E−02 | 8.9285E−03 | −1.4717E−01 | 9.3494E−02 |
| A12 | 9.4988E−04 | 7.9354E−03 | 5.1371E−04 | 2.3847E−01 | −1.3986E−02 |
| A14 | 9.0986E−04 | 0.0000E+00 | 0.0000E+00 | −9.3671E−03 | −7.6876E−02 |
| A16 | 0.0000E+00 | 0.0000E+00 | 0.0000E+00 | 0.0000E+00 | 0.0000E+00 |
| Surface | 7 | 8 | 9 | 10 | 11 |
| k | −7.6578E+00 | −5.3862E+00 | 4.9983E+01 | −3.0000E+01 | −2.0000E+01 |
| A4 | −1.0391E−01 | −7.9725E−02 | −2.5713E−02 | 7.5982E−03 | −8.2762E−02 |
| A6 | 1.8067E−01 | −9.3381E−02 | −8.2627E−02 | −3.4906E−03 | 2.9827E−02 |
| A8 | −1.2057E−01 | 1.7037E−01 | 9.5184E−02 | 2.5020E−04 | −6.8419E−03 |
| A10 | 1.2679E−01 | −1.0828E−01 | −5.7498E−02 | −6.6709E−04 | 1.2634E−03 |
| A12 | −1.0262E−01 | 3.2398E−02 | 1.7200E−02 | 1.0687E−04 | −2.1925E−04 |
| A14 | 2.7658E−02 | −3.7342E−03 | −2.3202E−03 | 7.1233E−06 | 1.6693E−05 |
| A16 | 0.0000E+00 | 0.0000E+00 | 4.1588E−05 | 0.0000E+00 | 0.0000E+00 |

In the sixth embodiment, the equation of the aspheric surface profiles of the aforementioned lens elements is the same as the equation of the first embodiment. Also, the definitions of these parameters shown in the following table are the same as those stated in the first embodiment with corresponding values for the second embodiment, so an explanation in this regard will not be provided again.

Moreover, these parameters can be calculated from Table 11 and Table 12 as the following values and satisfy the following conditions:

| Embodiment 6 | | | |
|---|---|---|---|
| f | 6.17 | V3-V2 | 31.0 |
| Fno | 2.80 | V3-V5 | 33.0 |
| FOV | 40.00 | SD/TD | 0.64 |
| \| f5 \| | 15.43 | f1/f | 0.35 |
| \| f3 \| | 7.84 | \| 1/f3 \| + \| 1/f5 \| | 0.19 |
| \| f4 \| | 5.88 | \| f/R9 \| | 0.43 |
| \| f2 \| | 3.07 | TTL/f | 0.84 |
| \| f1 \| | 2.14 | (R1 + R2)/(R1 − R2) | −0.52 |
| (R3 + R4)/(R3 − R4) | 0.24 | f4/f | −0.95 |

Figure 7A:
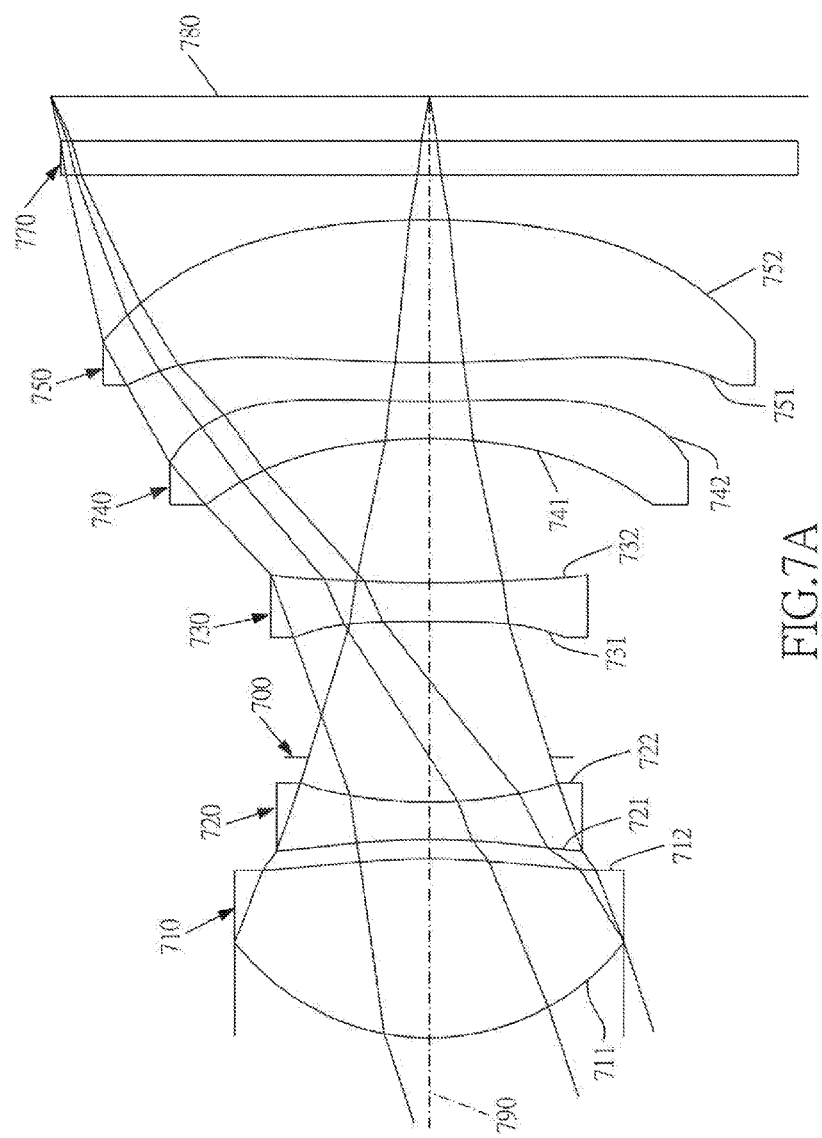
FIG. 7A shows an optical telephoto imaging lens in accordance with a seventh embodiment of the present invention.
Figure 7B:
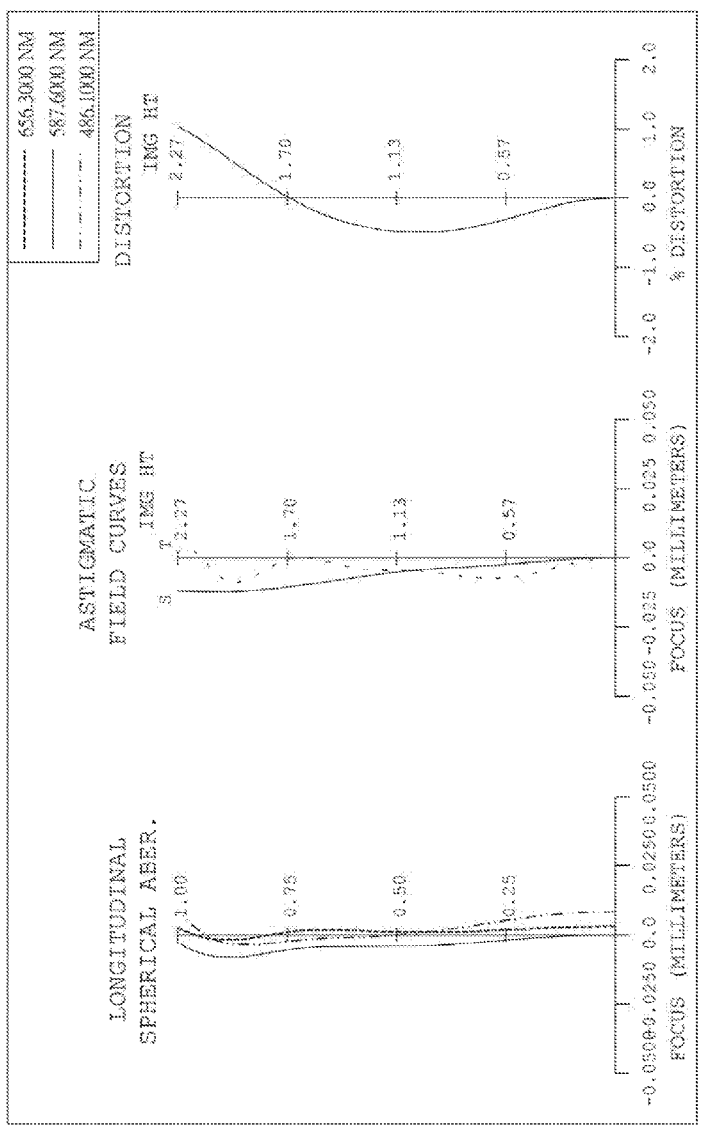
FIG. 7B shows the longitudinal spherical aberration curve, the astigmatic field curve and the distortion curve of the seventh embodiment of the present invention.

Referring to FIGS. 7A and 7B, FIG. 7A shows an optical telephoto imaging lens in accordance with a seventh embodiment of the present invention, and FIG. 7B shows, in order from left to right, the longitudinal spherical aberration curves, the astigmatic field curves, and the distortion curve of the seventh embodiment of the present invention. An optical telephoto imaging lens in accordance with the seventh embodiment of the present invention comprises an aperture stop 700 and a lens group. The lens group comprises, in order from an object side to the image side: a first lens element 710, a second lens element 720, a third lens element 730, a fourth lens element 740, a fifth lens element 750, an IR cut filter 770 which is made of glass, and an image plane 780, wherein the optical telephoto imaging lens has a total of five lens elements with refractive power. The aperture stop 700 is disposed between the second lens element 720 and the third lens element 730.

The first lens element 710 with a positive refractive power has an object-side surface 711 being convex near an optical axis 790 and an image-side surface 712 being convex near the optical axis 790, the object-side surface 711 and the image-side surface 712 are aspheric, and the first lens element 710 is made of plastic material.

The second lens element 720 with a negative refractive power has an object-side surface 721 being concave near the optical axis 790 and an image-side surface 722 being concave near the optical axis 790, the object-side surface 721 and the image-side surface 722 are aspheric, and the second lens element 720 is made of plastic material.

The third lens element 730 with a negative refractive power has an object-side surface 731 being concave near the optical axis 790 and an image-side surface 732 being concave near the optical axis 790, the object-side surface 731 and the image-side surface 732 are aspheric, the third lens element 730 is made of plastic material.

The fourth lens element 740 with a negative refractive power has an object-side surface 741 being concave near the optical axis 790 and an image-side surface 742 being concave near the optical axis 790, and the object-side surface 741 and the image-side surface 742 are aspheric, the fourth lens element 740 is made of plastic material.

The fifth lens element 750 with a positive refractive power has an object-side surface 751 being convex near the optical axis 790 and an image-side surface 752 being convex near the optical axis 790, the object-side surface 751 and the image-side surface 752 are aspheric, and the fifth lens element 750 is made of plastic material. In this embodiment, the object-side surface 751 of the fifth lens element 750 is concave at the periphery, namely, the object-side surface 751 of the fifth lens element 750 along the optical axis 790 to the periphery of the object-side surface 751 changes from convex to concave.

The IR cut filter 770 made of glass is located between the fifth lens element 750 and the image plane 780 and has no influence on the focal length of the telephoto imaging lens.

The detailed optical data of the seventh embodiment is shown in table 13, and the aspheric surface data is shown in table 14.

TABLE 13

Embodiment 7
f(focal length) = 6.78 mm, Fno = 2.91, HFOV = 18.33 deg.

| Surface | | Curvature Radius | | Thickness | Material | index | Abbe # | Focal length |
|---|---|---|---|---|---|---|---|---|
| 0 | object | Plane | | Infinity | | | | |
| 1 | lens 1 | 1.45 | (ASP) | 1.08 | plastic | 1.515 | 57.0 | 2.21 |
| 2 | | −3.95 | (ASP) | 0.11 | | | | |
| 3 | lens 2 | −4.07 | (ASP) | 0.23 | plastic | 1.615 | 25.0 | −2.83 |
| 4 | | 3.10 | (ASP) | 0.27 | | | | |
| 5 | aperture stop | plane | | 0.82 | | | | |
| 6 | lens 3 | −30.47 | (ASP) | 0.23 | plastic | 1.545 | 56.0 | −8.05 |
| 7 | | 5.13 | (ASP) | 0.87 | | | | |
| 8 | lens 4 | −3.29 | (ASP) | 0.23 | plastic | 1.545 | 56.0 | −4.76 |
| 9 | | 12.50 | (ASP) | 0.23 | | | | |
| 10 | lens 5 | 9.87 | (ASP) | 0.86 | plastic | 1.633 | 23.0 | 6.35 |
| 11 | | −6.55 | (ASP) | 0.27 | | | | |
| 12 | IR-filter | plane | | 0.21 | glass | 1.517 | 64.2 | — |
| 13 | | plane | | 0.27 | | | | |
| 14 | image | plane | | 0.00 | | | | |

* reference wavelength 587.6 nm

TABLE 14

Aspheric Coefficients

| Surface | 1 | 2 | 3 | 4 | 6 |
|---|---|---|---|---|---|
| k | −5.6560E−01 | 7.0254E+00 | −5.1567E+00 | −1.0000E+01 | 2.5000E+01 |
| A4 | 2.0930E−02 | 1.0341E−01 | 3.8902E−02 | 2.9033E−02 | −2.7195E−01 |
| A6 | 6.1664E−03 | −5.2879E−02 | 1.2873E−02 | 7.9311E−02 | 1.4851E−01 |
| A8 | 4.4265E−03 | 4.5308E−02 | −1.6024E−02 | 5.5447E−02 | −1.2233E−01 |
| A10 | −5.8746E−04 | −2.4635E−02 | 7.5606E−03 | −1.7339E−01 | 1.3407E−01 |
| A12 | 5.8042E−04 | 6.9551E−03 | 4.4466E−04 | 2.0089E−01 | −1.2106E−02 |
| A14 | 2.3917E−04 | 0.0000E+00 | 0.0000E+00 | −7.8980E−03 | −6.4819E−02 |
| A16 | 0.0000E+00 | 0.0000E+00 | 0.0000E+00 | 0.0000E+00 | 0.0000E+00 |

| Surface | 7 | 8 | 9 | 10 | 11 |
|---|---|---|---|---|---|
| k | −3.6986E+01 | −3.9958E+00 | 4.9983E+01 | −3.0000E+01 | −2.0000E+01 |
| A4 | −1.3777E−01 | −2.4942E−02 | −2.7867E−02 | −1.4931E−02 | −5.9950E−02 |
| A6 | 1.5814E−01 | −1.0258E−01 | −8.4892E−02 | −3.8152E−03 | 2.0317E−02 |
| A8 | −8.7377E−02 | 1.4366E−01 | 8.8565E−02 | 8.3358E−04 | −6.9850E−03 |
| A10 | 1.2500E−01 | −9.4269E−02 | −5.1769E−02 | −5.7782E−04 | 1.3997E−03 |
| A12 | −8.8178E−02 | 2.9697E−02 | 1.5284E−02 | 9.2502E−05 | −1.8978E−04 |
| A14 | 1.7553E−02 | −3.4588E−03 | −1.9572E−03 | 6.0061E−06 | 1.4075E−05 |
| A16 | 0.0000E+00 | 0.0000E+00 | 0.0000E+00 | 0.0000E+00 | 0.0000E+00 |

In the seventh embodiment, the equation of the aspheric surface profiles of the aforementioned lens elements is the same as the equation of the first embodiment. Also, the definitions of these parameters shown in the following table are the same as those stated in the first embodiment with corresponding values for the second embodiment, so an explanation in this regard will not be provided again.

Moreover, these parameters can be calculated from Table 13 and Table 14 as the following values and satisfy the following conditions:

| Embodiment 7 | | | |
|---|---|---|---|
| f | 6.78 | V3−V2 | 31.0 |
| Fno | 2.91 | V3−V5 | 33.0 |
| FOV | 36.66 | SD/TD | 0.66 |
| \| f5 \| | 6.35 | f1/f | 0.33 |
| \| f3 \| | 8.05 | \| 1/f3 \| + \| 1/f5 \| | 0.28 |

-continued

Embodiment 7

| | | | | |
|---|---|---|---|---|
| \| f4 \| | 4.76 | \| f/R9 \| | 0.69 | |
| \| f2 \| | 2.83 | TTL/f | 0.84 | |
| \| f1 \| | 2.21 | (R1 + R2)/(R1 − R2) | −0.46 | |
| (R3 + R4)/(R3 − R4) | 0.14 | f4/f | −0.70 | |

Figure 8A:
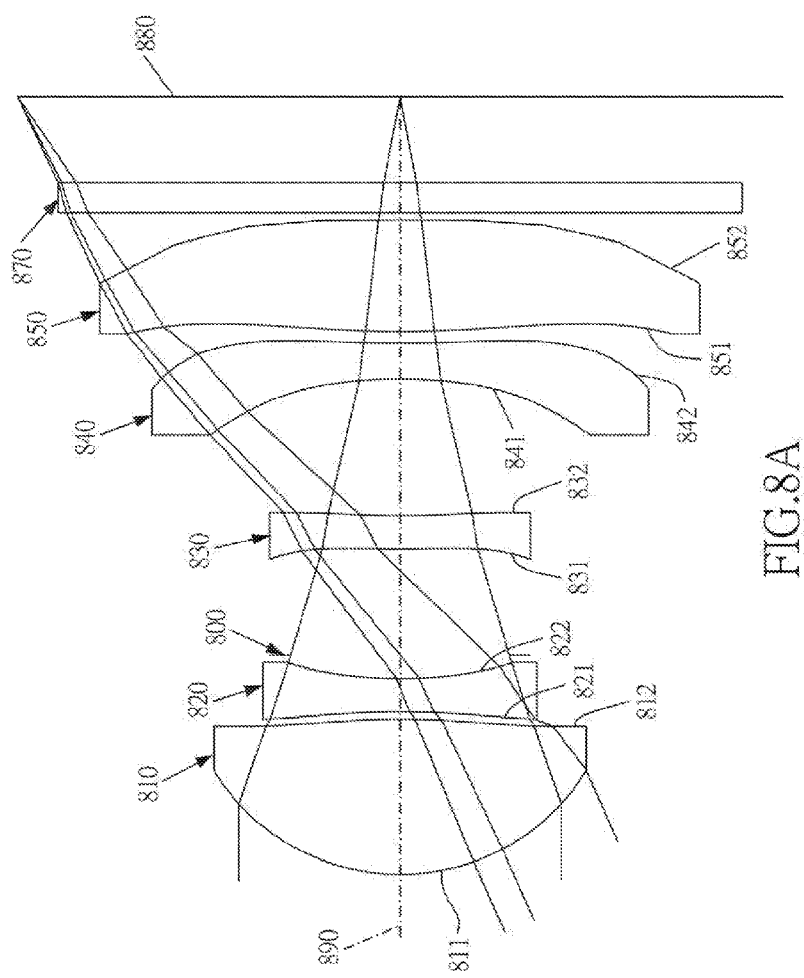
FIG. 8A shows an optical telephoto imaging lens in accordance with an eighth embodiment of the present invention.
Figure 8B:
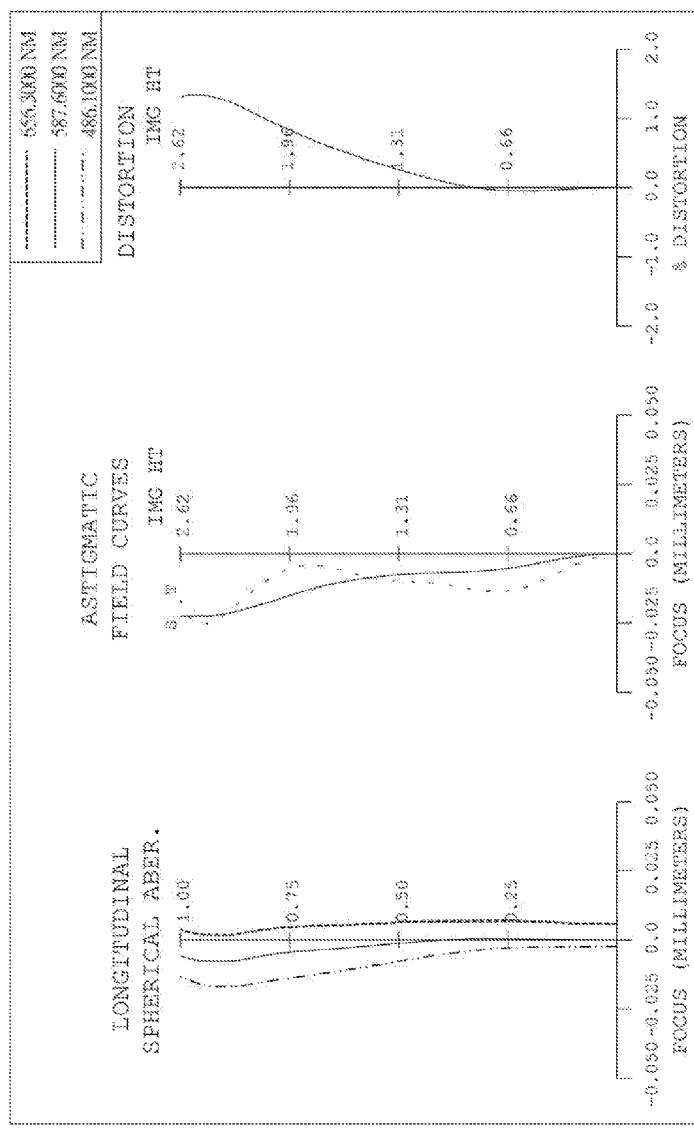
FIG. 8B shows the longitudinal spherical aberration curve, the astigmatic field curve and the distortion curve of the eighth embodiment of the present invention.

Referring to FIGS. 8A and 8B, FIG. 8A shows an optical telephoto imaging lens in accordance with an eighth embodiment of the present invention, and FIG. 8B shows, in order from left to right, the longitudinal spherical aberration curves, the astigmatic field curves, and the distortion curve of the eighth embodiment of the present invention. An optical telephoto imaging lens in accordance with the eighth embodiment of the present invention comprises an aperture stop 800 and a lens group. The lens group comprises, in order from an object side to the image side: a first lens element 810, a second lens element 820, a third lens element 830, a fourth lens element 840, a fifth lens element 850, an IR cut filter 870 which is made of glass, and an image plane 880, wherein the optical telephoto imaging lens has a total of five lens elements with refractive power. The aperture stop 800 is disposed between the second lens element 820 and the third lens element 830.

The first lens element 810 with a positive refractive power has an object-side surface 811 being convex near an optical axis 890 and an image-side surface 812 being convex near the optical axis 890, the object-side surface 811 and the image-side surface 812 are aspheric, and the first lens element 810 is made of plastic material.

The second lens element 820 with a negative refractive power has an object-side surface 821 being concave near the optical axis 890 and an image-side surface 822 being concave near the optical axis 890, the object-side surface 821 and the image-side surface 822 are aspheric, and the second lens element 820 is made of plastic material.

The third lens element 830 with a negative refractive power has an object-side surface 831 being convex near the optical axis 890 and an image-side surface 832 being concave near the optical axis 890, the object-side surface 831 and the image-side surface 832 are aspheric, the third lens element 830 is made of plastic material.

The fourth lens element 840 with a negative refractive power has an object-side surface 841 being concave near the optical axis 890 and an image-side surface 842 being concave near the optical axis 890, and the object-side surface 841 and the image-side surface 842 are aspheric, the fourth lens element 840 is made of plastic material.

The fifth lens element 850 with a positive refractive power has an object-side surface 851 being convex near the optical axis 890 and an image-side surface 852 being concave near the optical axis 890, the object-side surface 851 and the image-side surface 852 are aspheric, and the fifth lens element 850 is made of plastic material. In this embodiment, the object-side surface 851 of the fifth lens element 850 is concave at the periphery, namely, the object-side surface 851 of the fifth lens element 850 along the optical axis 890 to the periphery of the object-side surface 851 changes from convex to concave.

The IR cut filter 870 made of glass is located between the fifth lens element 850 and the image plane 880 and has no influence on the focal length of the telephoto imaging lens.

The detailed optical data of the eighth embodiment is shown in table 15, and the aspheric surface data is shown in table 16.

TABLE 15

Embodiment 8
f(focal length) = 5.95 mm, Fno = 2.7, HFOV = 23.5 deg.

| Surface | | Curvature Radius | | Thickness | Material | index | Abbe # | Focal length |
|---|---|---|---|---|---|---|---|---|
| 0 | object | Plane | | Infinity | | | | |
| 1 | lens 1 | 1.49 | (ASP) | 1.07 | plastic | 1.533 | 56.0 | 2.25 |
| 2 | | −4.63 | (ASP) | 0.05 | | | | |
| 3 | lens 2 | −5.13 | (ASP) | 0.23 | plastic | 1.609 | 26.0 | −3.08 |
| 4 | | 3.01 | (ASP) | 0.16 | | | | |
| 5 | aperture stop | plane | | 0.73 | | | | |
| 6 | lens 3 | 9.71 | (ASP) | 0.23 | plastic | 1.545 | 56.0 | −19.54 |
| 7 | | 5.04 | (ASP) | 0.94 | | | | |
| 8 | lens 4 | −3.71 | (ASP) | 0.25 | plastic | 1.545 | 56.0 | −4.94 |
| 9 | | 10.00 | (ASP) | 0.08 | | | | |
| 10 | lens 5 | 7.99 | (ASP) | 0.77 | plastic | 1.643 | 22.0 | 13.48 |
| 11 | | 99.69 | (ASP) | 0.05 | | | | |
| 12 | IR-filter | plane | | 0.21 | glass | 1.517 | 64.2 | — |
| 13 | | plane | | 0.59 | | | | |
| 14 | image | plane | | 0.00 | | | | |

* reference wavelength 587.6 nm

TABLE 16

Aspheric Coefficients

| Surface | 1 | 2 | 3 | 4 | 6 |
|---|---|---|---|---|---|
| k | −4.9503E−01 | 7.4819E+00 | −4.2732E+00 | −1.0000E+01 | 5.0000E+01 |
| A4 | 1.7842E−02 | 1.0002E−01 | 3.9582E−02 | 2.6941E−02 | −2.2073E−01 |
| A6 | 5.3997E−03 | −4.9622E−02 | 1.3701E−02 | 4.4336E−02 | 7.5077E−02 |
| A8 | 4.4613E−03 | 3.5801E−02 | −1.9638E−02 | 8.3865E−02 | −8.4483E−02 |
| A10 | −5.1985E−04 | −1.9510E−02 | 8.5310E−03 | −1.6986E−01 | 5.9081E−02 |
| A12 | 4.7342E−04 | 5.3160E−03 | 3.3459E−04 | 1.5168E−01 | 1.4788E−02 |
| A14 | 3.6046E−04 | 0.0000E+00 | 0.0000E+00 | −4.9850E−03 | −2.1707E−02 |
| A16 | 0.0000E+00 | 0.0000E+00 | 0.0000E+00 | 0.0000E+00 | 0.0000E+00 |

| Surface | 7 | 8 | 9 | 10 | 11 |
|---|---|---|---|---|---|
| k | −3.5673E+00 | 4.2122E+00 | 3.0451E+01 | −3.0000E+01 | −2.0000E+01 |
| A4 | −1.5385E−01 | −3.7507E−02 | −8.7922E−03 | 1.6999E−03 | −5.7803E−02 |
| A6 | 1.1740E−01 | −7.9605E−02 | −8.9422E−02 | −2.3540E−02 | 2.1345E−02 |
| A8 | −1.1165E−01 | 1.2245E−01 | 8.0905E−02 | 1.4952E−02 | −7.1879E−03 |
| A10 | 1.4474E−01 | −7.1441E−02 | −3.9102E−02 | −5.0845E−03 | 1.4008E−03 |
| A12 | −8.2212E−02 | 1.8015E−02 | 1.0196E−02 | 8.6872E−04 | −1.2484E−04 |

TABLE 16-continued

| Aspheric Coefficients | | | | | |
|---|---|---|---|---|---|
| A14 | 1.9355E−02 | −1.0174E−03 | −1.4098E−03 | −5.7241E−05 | 1.5408E−06 |
| A16 | 0.0000E+00 | −4.5104E−05 | 7.4572E−05 | 0.0000E+00 | 3.6436E−07 |

In the eighth embodiment, the equation of the aspheric surface profiles of the aforementioned lens elements is the same as the equation of the first embodiment. Also, the definitions of these parameters shown in the following table are the same as those stated in the first embodiment with corresponding values for the second embodiment, so an explanation in this regard will not be provided again.

Moreover, these parameters can be calculated from Table 15 and Table 16 as the following values and satisfy the following conditions:

| Embodiment 8 | | | |
|---|---|---|---|
| f | 5.95 | V3−V2 | 30.0 |
| Fno | 2.70 | V3−V5 | 34.0 |
| FOV | 47 | SD/TD | 0.66 |
| $\|f5\|$ | 13.48 | f1/f | 0.38 |
| $\|f3\|$ | 19.54 | $\|1/f3\| + \|1/f5\|$ | 0.13 |
| $\|f4\|$ | 4.94 | $\|f/R9\|$ | 0.74 |
| $\|f2\|$ | 3.08 | TTL/f | 0.90 |
| f1 | 2.25 | (R1 + R2)/(R1 − R2) | −0.51 |
| (R3 + R4)/(R3 − R4) | 0.26 | f4/f | −0.83 |

In the present optical telephoto imaging lens, the lens elements can be made of plastic or glass. If the lens elements are made of plastic, the cost will be effectively reduced. If the lens elements are made of glass, there is more freedom in distributing the refractive power of the optical telephoto imaging lens. Plastic lens elements can have aspheric surfaces, which allow more design parameter freedom (than spherical surfaces), so as to reduce the aberration and the number of the lens elements, as well as the total track length of the optical telephoto imaging lens.

In the present optical telephoto imaging lens, if the object-side or the image-side surface of the lens elements with refractive power is convex and the location of the convex surface is not defined, the object-side or the image-side surface of the lens elements near the optical axis is convex. If the object-side or the image-side surface of the lens elements is concave and the location of the concave surface is not defined, the object-side or the image-side surface of the lens elements near the optical axis is concave.

The optical telephoto imaging lens of the present invention can be used in focusing optical systems and can obtain better image quality. The optical telephoto imaging lens of the present invention can also be used in electronic imaging systems, such as, 3D image capturing, digital camera, mobile device, digital flat panel or vehicle camera.

The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical telephoto imaging lens comprising an aperture stop and a lens group, the lens group comprising, in order from an object side to the image side:

a first lens element with a positive refractive power having an object-side surface being convex near an optical axis and an image-side surface being convex near the optical axis, the object-side surface and the image-side surface of the first lens element being aspheric, and the first lens element being made of plastic material;

a second lens element with a negative refractive power having an object-side surface being concave near the optical axis and an image-side surface being concave near the optical axis, the object-side surface and the image-side surface of the second lens element being aspheric, and the second lens element being made of plastic material;

a third lens element with a refractive power having an image-side surface being concave near the optical axis, an object-side surface and the image-side surface of the third lens element being aspheric, the third lens element being made of plastic material;

a fourth lens element with a negative refractive power having an object-side surface being concave near the optical axis, the object-side surface and an image-side surface of the fourth lens element being aspheric, the fourth lens element being made of plastic material;

a fifth lens element with a positive refractive power, an object-side surface and an image-side surface of the fifth lens element being aspheric, the fifth lens element being made of plastic material, and the object-side surface of the fifth lens element being concave at the periphery;

wherein a focal length of the first lens element is f1, a focal lens length of the second lens element is f2, a focal length of the third lens element is f3, a focal length of the fourth lens element is f4, a focal length of the fifth lens element is f5, a radius of curvature of the object-side surface of the second lens element is R3, a radius of curvature of the image-side surface of the second lens element is R4, and they satisfy the relations:

$|fn|>|f4|>|f2|>|f1|$, wherein $n=3$ and 5;

$0<(R3+R4)/(R3-R4)<0.5$.

2. The optical telephoto imaging lens as claimed in claim 1, wherein an Abbe number of the second lens element is V2, an Abbe number of the third lens element is V3, an Abbe number of the fifth lens element is V5, and they satisfy the following relations:

$25<V3-V2<40; 25<V3-V5<40$.

3. The optical telephoto imaging lens as claimed in claim 1, wherein a distance along an optical axis between the aperture stop and the image-side surface of the fifth lens element is SD, a distance along an optical axis between the object-side surface of the first lens element and the image-side surface of the fifth lens element is TD, and they satisfy the relation:

$0.55<SD/TD<0.9$.

4. The optical telephoto imaging lens as claimed in claim 1, wherein a focal length of the optical telephoto imaging lens is f, the focal length of the first lens element is f1, and they satisfy the relation:

$0.25<f1/f<0.5$.

5. The optical telephoto imaging lens as claimed in claim 1, wherein the focal length of the third lens element is f3, the focal length of the fifth lens element is f5, and they satisfy the relation:

$|1/f3|+|1/f5|<0.35$.

6. The optical telephoto imaging lens as claimed in claim 5, wherein a focal length of the optical telephoto imaging lens is f, a radius of curvature of the object-side surface of the fifth lens element is R9, and they satisfy the relation:

$|f/R9|<1$.

7. The optical telephoto imaging lens as claimed in claim 1, wherein a focal length of the optical telephoto imaging lens is f, a distance along the optical axis from the object-side surface of the first lens element to the image plane is TTL, and they satisfy the relation:

$0.75<TTL/f<1$.

8. The optical telephoto imaging lens as claimed in claim 7, wherein the optical telephoto image lens has a maximum view angle FOV, and it satisfies the relation:

30 degree<$FOV$<50 degree.

9. An optical telephoto imaging lens comprising an aperture stop and a lens group, the lens group comprising, in order from an object side to the image side:
 a first lens element with a positive refractive power having an object-side surface being convex near an optical axis and an image-side surface being convex near the optical axis, the object-side surface and the image-side surface of the first lens element being aspheric, and the first lens element being made of plastic material;
 a second lens element with a negative refractive power having an object-side surface being concave near the optical axis and an image-side surface being concave near the optical axis, the object-side surface and the image-side surface of the second lens element being aspheric, and the second lens element being made of plastic material;
 a third lens element with a refractive power having an image-side surface being concave near the optical axis, an object-side surface and the image-side surface of the third lens element being aspheric, the third lens element being made of plastic material;
 a fourth lens element with a negative refractive power having an object-side surface being concave near the optical axis, the object-side surface and an image-side surface of the fourth lens element being aspheric, the fourth lens element being made of plastic material;
 a fifth lens element with a refractive power, an object-side surface and an image-side surface of the fifth lens element being aspheric, the fifth lens element being made of plastic material, and the object-side surface of the fifth lens element being concave at the periphery;
wherein a focal length of the optical telephoto imaging lens is f, a focal length of the third lens element is f3, a focal length of the fifth lens element is f5, a radius of curvature of the object-side surface of the fifth lens element is R9, an Abbe number of the second lens element is V2, an Abbe number of the third lens element is V3, an Abbe number of the fifth lens element is V5, and they satisfy the relations:

$|1/f3|+|1/f5|<0.35$;

$|f/R9|<1$;

$25<V3-V2<40$;

$25<V3-V5<40$.

10. The optical telephoto imaging lens as claimed in claim 9, wherein a distance along an optical axis between the aperture stop and the image-side surface of the fifth lens element is SD, a distance along an optical axis between the object-side surface of the first lens element and the image-side surface of the fifth lens element is TD, and they satisfy the relation:

$0.55<SD/TD<0.9$.

11. The optical telephoto imaging lens as claimed in claim 9, wherein the focal length of the optical telephoto imaging lens is f, a focal length of the first lens element is f1, and they satisfy the relation:

$0.25<f1/f<0.5$.

12. The optical telephoto imaging lens as claimed in claim 11, wherein a radius of curvature of the object-side surface of the first lens element is R1, a radius of curvature of the image-side surface of the first lens element is R2, and they satisfy the relation:

$-0.6<(R1+R2)/(R1-R2)<-0.35$.

13. The optical telephoto imaging lens as claimed in claim 9, wherein the focal length of the optical telephoto imaging lens is f, a focal length of the fourth lens element is f4, and they satisfy the relation:

$-2.0<f4/f<-0.5$.

14. The optical telephoto imaging lens as claimed in claim 9, wherein the focal length of the optical telephoto imaging lens is f, a distance along the optical axis from the object-side surface of the first lens element to the image plane is TTL, and they satisfy the relation:

$0.75<TTL/f<1$.

15. The optical telephoto imaging lens as claimed in claim 14, wherein the optical telephoto image lens has a maximum view angle FOV, and it satisfies the relation:

30 degree<$FOV$<50 degree.

* * * * *